US012166602B2

(12) United States Patent
Kamisetty et al.

(10) Patent No.: US 12,166,602 B2
(45) Date of Patent: Dec. 10, 2024

(54) METHODS AND SYSTEMS FOR PROCESSING NETWORK PACKETS USING A SERVICE DEVICE IN A SMART SWITCH

(71) Applicant: Pensando Systems Inc., Milpitas, CA (US)

(72) Inventors: Sarat Kamisetty, Fremont, CA (US); Bharat Kumar Bandaru, Pleasanton, CA (US); Krishna Doddapaneni, Cupertino, CA (US)

(73) Assignee: Pensando Systems Inc., Milpitas, CA (US)

( * ) Notice: Subject to any disclaimer, the term of this patent is extended or adjusted under 35 U.S.C. 154(b) by 105 days.

(21) Appl. No.: 17/503,128

(22) Filed: Oct. 15, 2021

(65) Prior Publication Data
US 2023/0117644 A1  Apr. 20, 2023

(51) Int. Cl.
*H04L 12/46* (2006.01)
*H04L 12/931* (2013.01)
*H04L 49/354* (2022.01)

(52) U.S. Cl.
CPC ........ *H04L 12/4645* (2013.01); *H04L 49/354* (2013.01)

(58) Field of Classification Search
CPC .................... H04L 12/4645; H04L 49/354
USPC ........................................................ 370/254
See application file for complete search history.

(56) References Cited

U.S. PATENT DOCUMENTS

| 7,899,048 | B1 | 3/2011 | Walker et al. |
| 9,021,547 | B1* | 4/2015 | Lin .......................... H04L 63/20 726/1 |
| 2005/0229249 | A1* | 10/2005 | Piwonka ................. G06F 21/85 726/22 |
| 2007/0258462 | A1* | 11/2007 | Veits ................... H04L 12/4645 370/395.31 |

(Continued)

FOREIGN PATENT DOCUMENTS

| WO | 2007076679 | 7/2007 | |
| WO | WO-2022199202 A1 * | 9/2022 | ........... H04L 49/253 |

OTHER PUBLICATIONS

Broadcom, "BCM56070; Switch Programming Guide", 56070-PG203-PUB, Aug. 12, 2020, 169 pgs.

(Continued)

*Primary Examiner* — Faisal Choudhury
(74) *Attorney, Agent, or Firm* — LOZA & LOZA, LLP

(57) ABSTRACT

A network appliance or smart switch can include service devices as well as a switching device such as those used in high-speed switches having limited processing ability and are stateless with respect to sessions. Service devices can provide stateful and complex processing. A first exposed port of a switching device can receive network packets and can determine which network packets the service devices are to process to produce processed network packets. A network packet can be sent to a service device in a redirected packet. A processed network packet can be received from a service device in a reinjected packet that is used to recover a port identifier of the first exposed port. The port identifier can be used to determine a network destination of the processed network packet. The processed network packet can be sent from a second exposed port of the switching device toward the network destination.

29 Claims, 15 Drawing Sheets

(56) References Cited

U.S. PATENT DOCUMENTS

| | | | |
|---|---|---|---|
| 2008/0095062 A1* | 4/2008 | Shankar | H04L 49/90 370/428 |
| 2016/0218973 A1* | 7/2016 | Anand | H04L 45/745 |
| 2016/0323166 A1* | 11/2016 | Pandey | H04L 43/0852 |
| 2018/0139132 A1* | 5/2018 | Edsall | H04L 45/74 |
| 2020/0314030 A1* | 10/2020 | Goel | H04L 45/74 |
| 2021/0029031 A1* | 1/2021 | Boutros | H04L 45/74 |
| 2022/0197683 A1* | 6/2022 | Potlapally | H04L 45/76 |
| 2023/0012308 A1* | 1/2023 | Kommula | H04L 41/122 |

OTHER PUBLICATIONS

Wikipedia, "IEEE 802.1ad", https://en.wikipedia.org/wiki/IEEE_802.1ad, retrieved Sep. 7, 2021, 5 pgs.

Wikipedia, "IEEE 802.1Q", https://en.wikipedia.org/wiki/IEEE_802.1Q, retrieved Jun. 30, 2021, 5 pgs.

Wikipedia, "Multiple Registration Protocol", https://en.wikipedia.org/wiki/Multiple_Registration_Protocol, retrieved Sep. 7, 2021, 3 pgs.

Wheeler, Bob, "Tomahawk 4 Switch First to 25.6TBPS; Broadcom Doubles 400Gbps Ports With Unprecedented 512 Serdes", Microprocessor Report, Dec. 2019, 3 pgs.

International Search Report and Written Opinion, PCT/US22/45235, Feb. 22, 2023, 10 pgs.

* cited by examiner

METHODS AND SYSTEMS FOR PROCESSING NETWORK PACKETS USING A SERVICE DEVICE IN A SMART SWITCH

TECHNICAL FIELD

The embodiments relate to computer networks, local area networks, network appliances such as routers, switches, network interface cards (NICs), smart NICs, and distributed service cards (DSCs). The embodiments also relate to packet processing pipelines, application specific integrated circuits implementing packet processing pipelines, and to using a service device to process network packets transiting a switch.

BACKGROUND

Network switches normally process a network packet by receiving the network packet, processing the network packet to determine where to forward the packet, then forwarding the packet toward its destination. A packet can be sent toward a destination by being sent directly to the destination or by being sent to an intermediate device that then, in turn, sends the network packet toward its destination. Network packets are often processed by examining the packets' header data and applying rules such as routing rules to determine where to forward the packet. Packet processing can be performed by a packet processing pipeline such as a "P4" packet processing pipeline. The concept of a domain-specific language for programming protocol-independent packet processors, known simply as "P4," developed as a way to provide some flexibility at the data plane of a network appliance. The "P4$_{16}$ Language Specification," version 1.2.2, as published by the P4 Language Consortium on May 17, 2021, which is incorporated by reference herein, specifies a recent version of the P4 domain specific language that can be used for programming the data plane of network appliances. P4 (also referred to herein as the "P4 specification," the "P4 language," and the "P4 program") is designed to be implementable on a large variety of targets including switches, routers, programmable network interface cards (NICs), software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include receiving a network packet at a first exposed port of a switching device, determining that the network packet is to be processed by a service device that is configured to produce a processed network packet by processing the network packet, sending the network packet to the service device in a redirected packet, receiving the processed network packet from the service device in a reinjected packet, using the reinjected packet to recover a port identifier of the first exposed port, using the port identifier to determine a network destination of the processed network packet, and sending the processed network packet from a second exposed port of the switching device toward the network destination.

Another aspect of the subject matter described in this disclosure can be implemented by a network appliance configured to send and receive external network traffic. The network appliance can include a service ASIC that is configured to produce a processed network packet by processing a network packet, a switching ASIC that is configured with a service port and a plurality of exposed ports that includes a first exposed port and a second exposed port. The network appliance can also include an enclosure that contains the switching ASIC and service ASIC. The exposed ports can be configured to send and receive the external network traffic, the switching ASIC can be configured to receive the network packet on the first exposed port, the switching ASIC can be configured to determine that the network packet is to be processed by the service ASIC, the switching ASIC can be configured to send the network packet to the service ASIC in a redirected packet via the service port, the switching ASIC can be configured to receive the processed network packet from the service ASIC in a reinjected packet via the service port, the switching ASIC can be configured to use the reinjected packet to recover a port identifier of the first exposed port, the switching ASIC can be configured to use the port identifier to determine a network destination of the processed network packet, and the switching ASIC can be configured to send the processed network packet from the second exposed port toward the network destination.

Yet another aspect of the subject matter described in this disclosure can be implemented by a system. The system can include a service means configured to produce a processed network packet by processing a network packet, a switching means configured with a private communication means for privately communicating with the service means, a means for determining that the network packet is to be processed by the service means, a means for recovering a port identifier from an encapsulation means that encapsulates the processed network packet, a means for using the port identifier to determine a network destination of the processed network packet, and a means for sending the processed network packet toward the network destination.

In some implementations of the methods and devices the redirected packet and the reinjected packet include the port identifier. In some implementations of the methods and devices the network packet includes a VLAN identifier, the redirected packet includes the VLAN identifier and the port identifier, and the reinjected packet includes the VLAN identifier and the port identifier. In some implementations of the methods and devices the network packet includes a VLAN identifier, the redirected packet includes the VLAN identifier and the port identifier in a first QinQ header data, and the reinjected packet includes the VLAN identifier and the port identifier in a second QinQ header data. In some implementations of the methods and devices the network packet includes a VLAN identifier, and the redirected packet is a HiGig or HiGig2 packet that includes the VLAN identifier and the port identifier. In some implementations of the methods and devices the switching device is configured with a plurality of exposed ports that includes the first exposed port and the second exposed port, the switching device is configured with a service port that is used for sending a plurality of redirected packets to the service device, the switching device is configured to prevent reconfiguration of the service port by a user, and the switching device is configured to allow configuration of the exposed ports by the user.

In some implementations of the methods and devices the switching device is a switching ASIC, the service device is a service ASIC that includes a reconfigurable packet processing pipeline and a CPU core, and the switching ASIC and the service ASIC are connected to a host CPU via a PCIe bus. In some implementations of the methods and devices the redirected packet includes a host CPU destination indicator that indicates to the service device that the network packet has a destination address indicating the host CPU. In some implementations of the methods and devices the switching device is a locked protocol device. In some implementations of the methods and devices the switching device uses metadata associated with the processed network packet to prevent recirculating the processed network packet through the service device.

In some implementations of the methods and devices the network packet has an unknown destination, the service device processes a single copy of the network packet, and the switching device uses a plurality of exposed ports to transmit a plurality of copies of the processed network packet. In some implementations of the methods and devices the method includes producing the processed network packet by processing the network packet. In some implementations of the methods and devices the switching device is configured to determine that the network packet is to be processed by the service device, send the network packet to the service device in the redirected packet, receive the processed network packet from the service device in the reinjected packet, use the reinjected packet to recover the port identifier of the first exposed port, use the port identifier to determine the network destination of the processed network packet, and send the processed network packet from the second exposed port.

In some implementations of the methods and devices the switching ASIC is a locked protocol device. In some implementations of the methods and devices the switching ASIC is configured to prevent reconfiguration of the service port by a user, and the switching ASIC is configured to allow configuration of the exposed ports by the user.

In some implementations of the methods and devices the devices can include a means for enclosing the service means and the switching means with a host CPU configured to communicate with the service means and the switching means.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
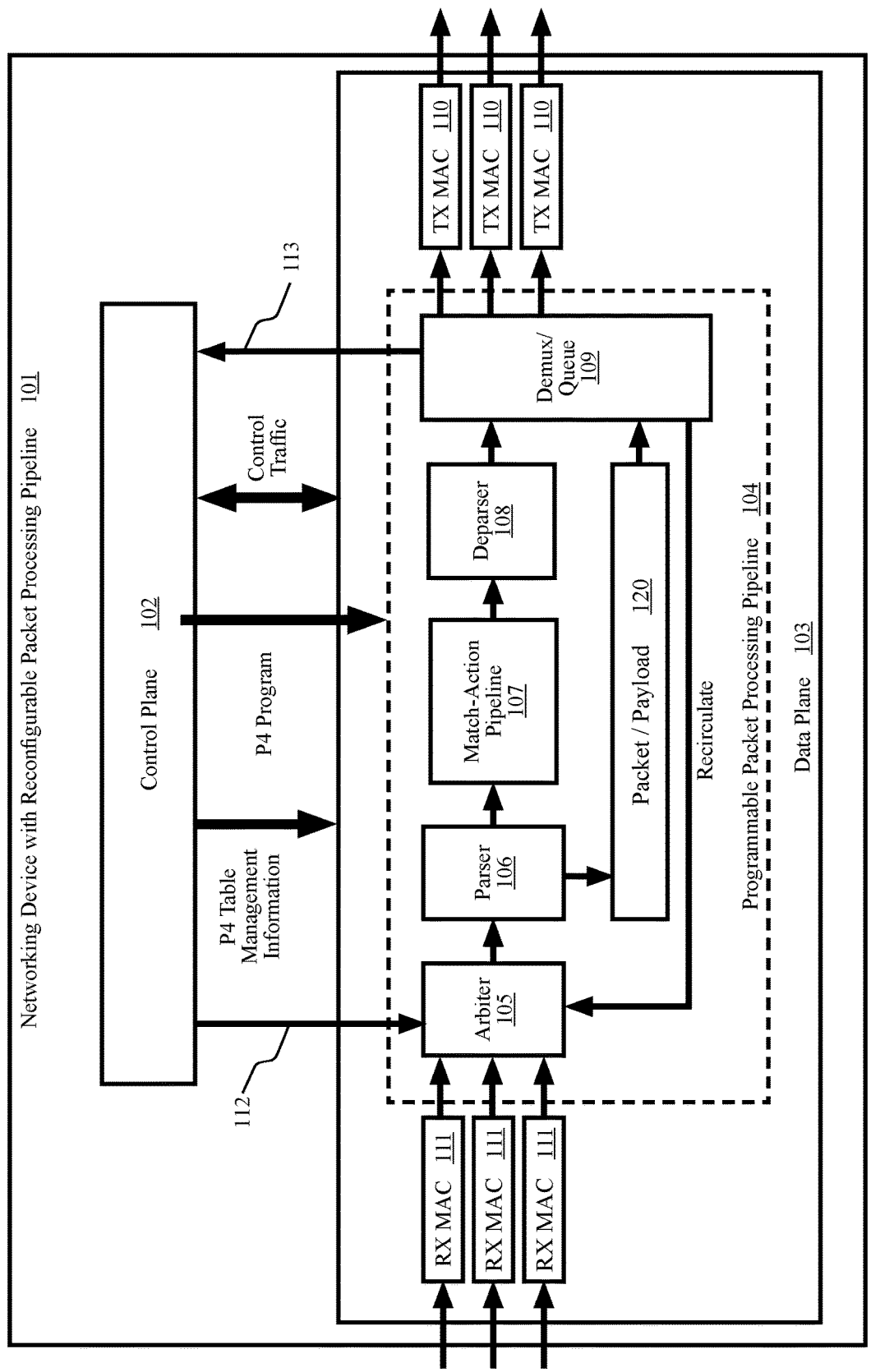
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network traffic flowing between servers, also called hosts or host computers, in data centers often requires complex layer 4 and higher layer internet protocol (IP) services such as custom encapsulations, firewall, network address translation (NAT), micro segmentation, etc. These and other such services can be provided by smart network interface cards (NICs) installed in the servers, by dedicated physical appliances in the network, and by dedicated virtual appliances running as virtual machines, sometimes called Network Virtual Appliances (NVAs) running in the hosts. There are some drawbacks with these approaches of providing such services. One drawback is the complexity in configuring the network and provisioning the dedicated physical/virtual appliances for redirecting the traffic selectively to them and for reinjecting them back into the network for forwarding. Another drawback is that the dedicated physical/virtual appliances need to be monitored separately from the other networking devices and have to be integrated into the rest of the rest of the ecosystem. Yet another drawback is that the life cycle of the dedicated physical/virtual appliances has to be separately maintained with respect to the other networking hardware/software when it comes to software upgrades and hardware. Furthermore, these additional appliances, physical or virtual, introduced into the network for certain dedicated functions increase the overall operational costs and require cabling and rewiring every time new units are installed either for scaling or new features.

A smart switch can minimize the drawbacks and can address other issues faced by security and networking operators without sacrificing scale, performance, and operational flexibility in dealing with networking and security separately. A traditional networking switch or top-of-rack switch (ToR) can have a switching device, typically a switching ASIC such as one of the commercially available ASICs, that provides Layer 2 and Layer 3 forwarding with some support for policy based forwarding and a small set of global Network Access Control Lists (NACL)s, that are stateless, and that process packets without any session/flow awareness. The more advanced such switching ASICs may provide basic encapsulation and decapsulation like VxLAN and generic routing encapsulation (GRE) for overlay networking. The switching ASIC's layer 4 and higher layer services are minimal, typically stateless, and very limited in both scale and performance.

The switching devices are configurable to the extent that network packets can be inspected and routing decisions can be made based on media access control (MAC) numbers, IP addresses, VLAN tags/identifiers, virtual routing and forwarding (VRF), the port that received the packet, the port channel that received the packets, etc. Note that these routing decisions are based on information in the packet itself and are therefore stateless decisions. The switching devices typically store one or more network access control list (NACL) that instruct the switching device to make specific decisions for forwarding each packet. In a traditional switch, a packet is processed by the switching device only once because the packet is received at an ingress port, processed within the switching device, and transmitted from an egress port.

A smart switch can include a switching device (e.g., a switching ASIC) as well as service devices. The service devices can be substantially similar to devices currently used in distributed service cards (DSCs) or Smart NICs that may be installed in servers to offload complex networking tasks from the server CPUs. As such, the service device can provide higher layer intelligent services that are flow/session aware and provide more flexible features than are currently available in switching ASICs or switching devices. The difficulty lies in determining which network packets are to be processed by the service devices, getting those packets to the service devices, and preserving sufficient state information such that the packets can be properly reinjected into the network traffic being processed by the switching device.

A switching device has many ingress and egress ports and can process a packet received on one port by determining which port to transmit the packet from. For traditional network switches, all of the ports are exposed ports and the end user can configure all of the ports. The exposed ports are the ports that a switch (e.g., smart switch or other switch) can use to send and receive network traffic to and from the switch. The switching device in a smart switch has exposed ports and service ports. The end user may be unable to configure the service ports. The NACLs of the switching device can be configured to identify network packets that are received on an exposed port and are to be formed into redirected packets that are sent out a service port to a service device. The service device can process the redirected packet to produce a reinjected packet that is sent back to the switching device via a service port. The NACLs of the switching device can also be configured to identify reinjected packets that are received on a service port and are to be formed into network packets that are sent out an exposed port toward a network destination. Unlike a traditional switch, the switching device in a smart switch may process a packet twice. The first time is when the packet is received from an exposed port, processed by the switching device, and transmitted via a service port as a redirected packet. The second time is when the packet is received, as a reinjected packet, from a service port, processed by the switching device, and transmitted from an exposed port. The redirected packet and the reinjected packet can include data that the service device, being stateless, does not preserve after transmitting a packet from any port.

Port identifiers are examples of data that may be included in a redirected packet and a reinjected packet. The port identifier can identify the port or port channel on which a switching device receives a network packet. The switching device does not preserve data, such as the port identifier, for a network packet after transmitting the packet. That data may still be needed when the packet comes back, as a reinjected packet, from a service device.

A network switch can be a locked protocol device. A locked protocol device is a device that implements only a specific set of protocols. Users of a locked protocol device, such as a smart switch manufacturer that uses a locked protocol device produced by an upstream manufacturer, are unable to implement additional protocols on the locked protocol device. The redirected packet and the reinjected packet must use one of the protocols that the service device implements. Most switching devices, including locked protocol switching devices, implement the QinQ protocol. Data, such as the port identifier, can be included in the QinQ header data of a redirected packet. Such an operation is safe because the redirected packet is not transmitted via an exposed port to the internet in general, but is received by a service device that expects to find such data in the QinQ header data. Data, such as the port identifier, can be included in the QinQ header data of a reinjected packet. Such an operation is safe because the reinjected packet is not transmitted via an exposed port to the internet in general, but is received by a switching device that expects to find such data in the QinQ header data.

Some switching devices are not locked protocol devices and can be configured to implement additional network protocols. As such, a smart switch manufacturer or servicer may configure the switching device to implement a vendor specific protocol or a nonstandard protocol. A switching device that is not a locked protocol device may thereby exchange packets with the service device using a custom protocol. For example, the redirected packets and reinjected packets use a protocol such as HiGig, HiGig2, HiGig+, or other such protocols. Those practiced in the art of switching ASICs are familiar with protocols such as HiGig, HiGig2, and HiGig+. A HiGig packet is a packet that uses the HiGig protocol. A HiGig2 packet is a packet that uses the HiGig2 protocol. The use of such protocols between the switching device and the service device is safe when the redirected packets and the reinjected packets are not transmitted from an exposed port.

There are many advantages to using a service device to process network packets in a smart switch. One advantage is reduced complexity in configuring the network and provisioning dedicated physical/virtual appliances that implement stateful network services such as NAT. Further advantages include no longer needing to monitor such dedicated physical/virtual appliances or to integrate them into the rest of the rest of the ecosystem. Another advantage is that the life cycles of the network devices providing many services are incorporated with those of the other networking hardware/software. A yet further advantage is lower operational costs due to no longer needing cabling and rewiring every time additional services are deployed.

In the field of data networking, the functionality of network appliances such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in one or more fixed function application specific integrated circuit (ASIC). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing.

FIG. 1 is a functional block diagram of a network appliance having a control plane and a data plane and in which aspects may be implemented. A network appliance 101 can have a control plane 102 and a data plane 103. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The document "P4$_{16}$ Language Specification," version 1.2.2, published by the P4 Language Consortium on May 17, 2021, which is incorporated by reference herein, describes the P4 domain-specific language that can be used for programming the data plane of network appliances. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple media access controllers (MACs) such as receive (RX) MACs 111 and transmit (TX) MACs 110. The RX MACs 111 implement media access control on incoming packets via, for example, a MAC protocol. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, as a P4 programmable router, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A network appliance 101 can have a peripheral component interconnect extended (PCIe) interface such as PCIe media access control (MAC). A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and multiple virtual functions (VFs). A PF BAR map can be used by the host machine to communicate with the PCIe card. A VF BAR map can be used by a virtual machine (VM) running on the host to communicate with the PCIe card. Typically, the VM can access the NIC using a device driver within the VM and at a memory address within the VMs memory space.

Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 2:
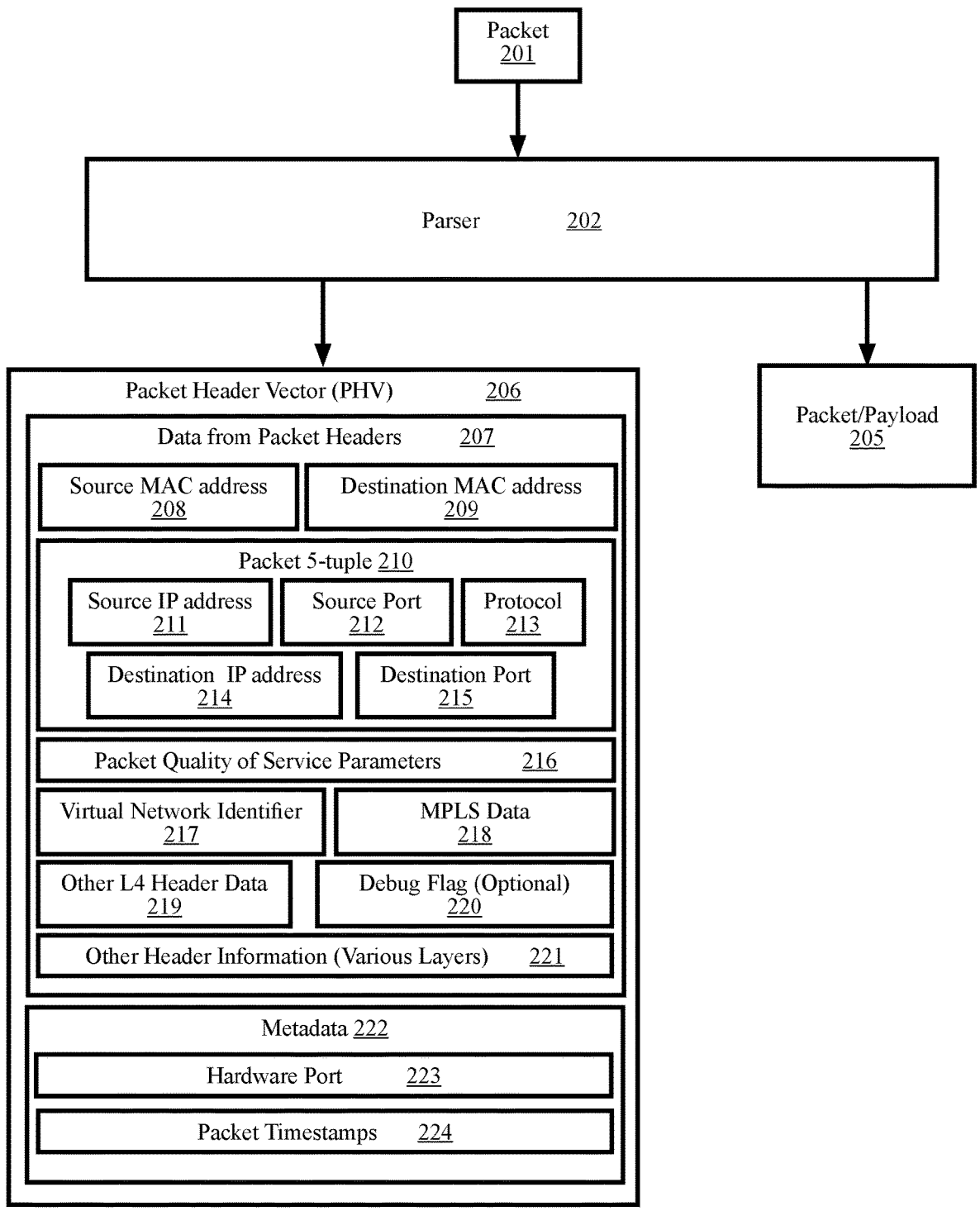
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamps 224 indicating when the packet 201 was received by the network appliance, enqueued, dequeued, etc.

The source MAC address 208 and the destination MAC address 209 can be obtained from the packet's layer 2 header. The source IP address 211 can be obtained from the packet's layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packet's layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. A number of different sources may add a debug flag 220 to the PHV. A trace instruction or flag may be present in the network packet, in which case the parser may place the debug flag in the PHV. For example, the layer 7 packet may include the trace instruction or flag. If the network packet does not include a trace instruction or flag, then the parser might not add a debug flag to the PHV or might not set a debug flag in the PHV. A match-action unit in the packet processing pipeline may be configured to turn on tracing for certain network flows and may therefore add the debug flag 220 to the PHV or may set a debug flag in the PHV. The debug flag 220 may be in the metadata 222. The other header information 221 can include other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
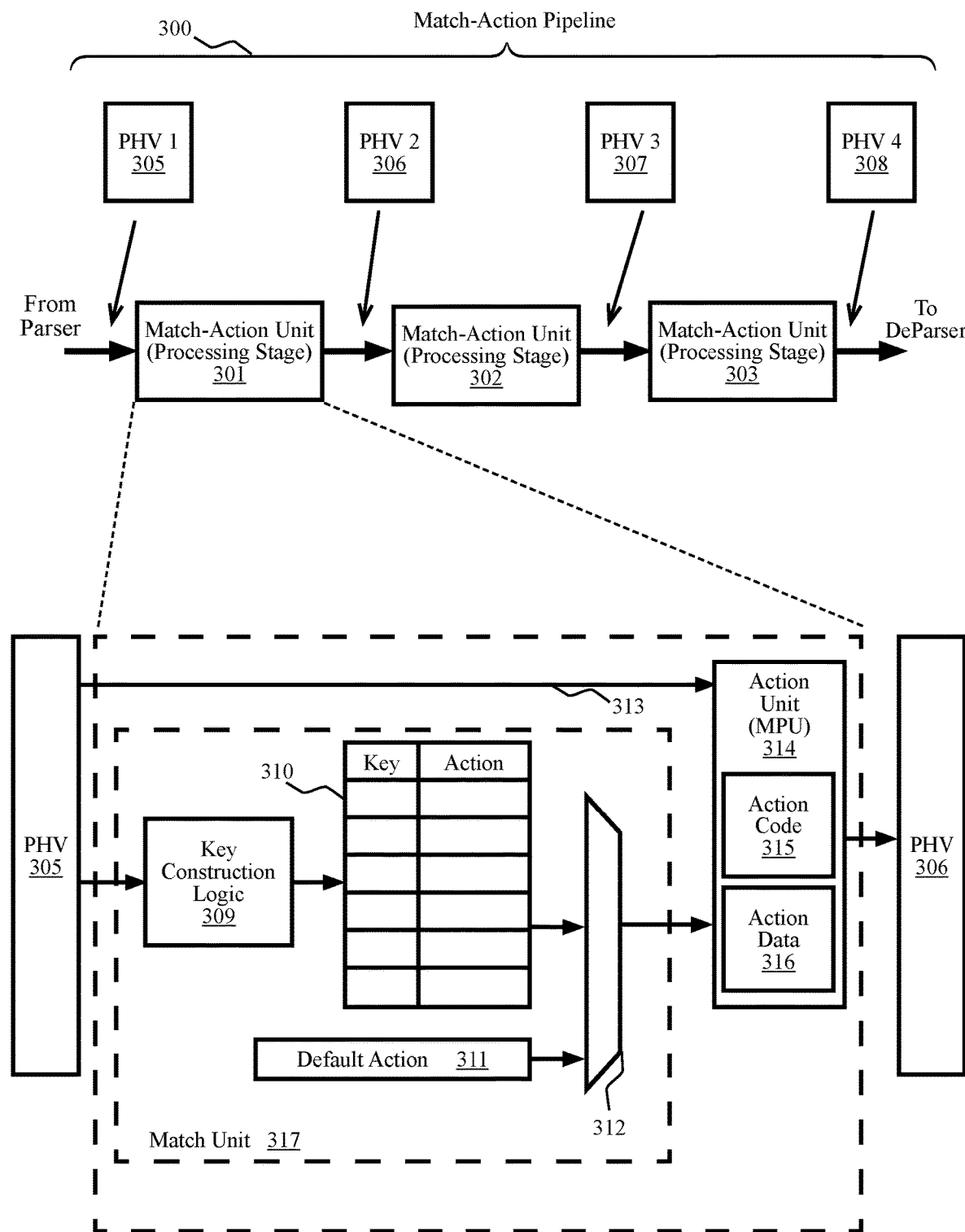
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often simply called stages, of the packet processing pipeline. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table can be managed by the control plane.

Figure 4:
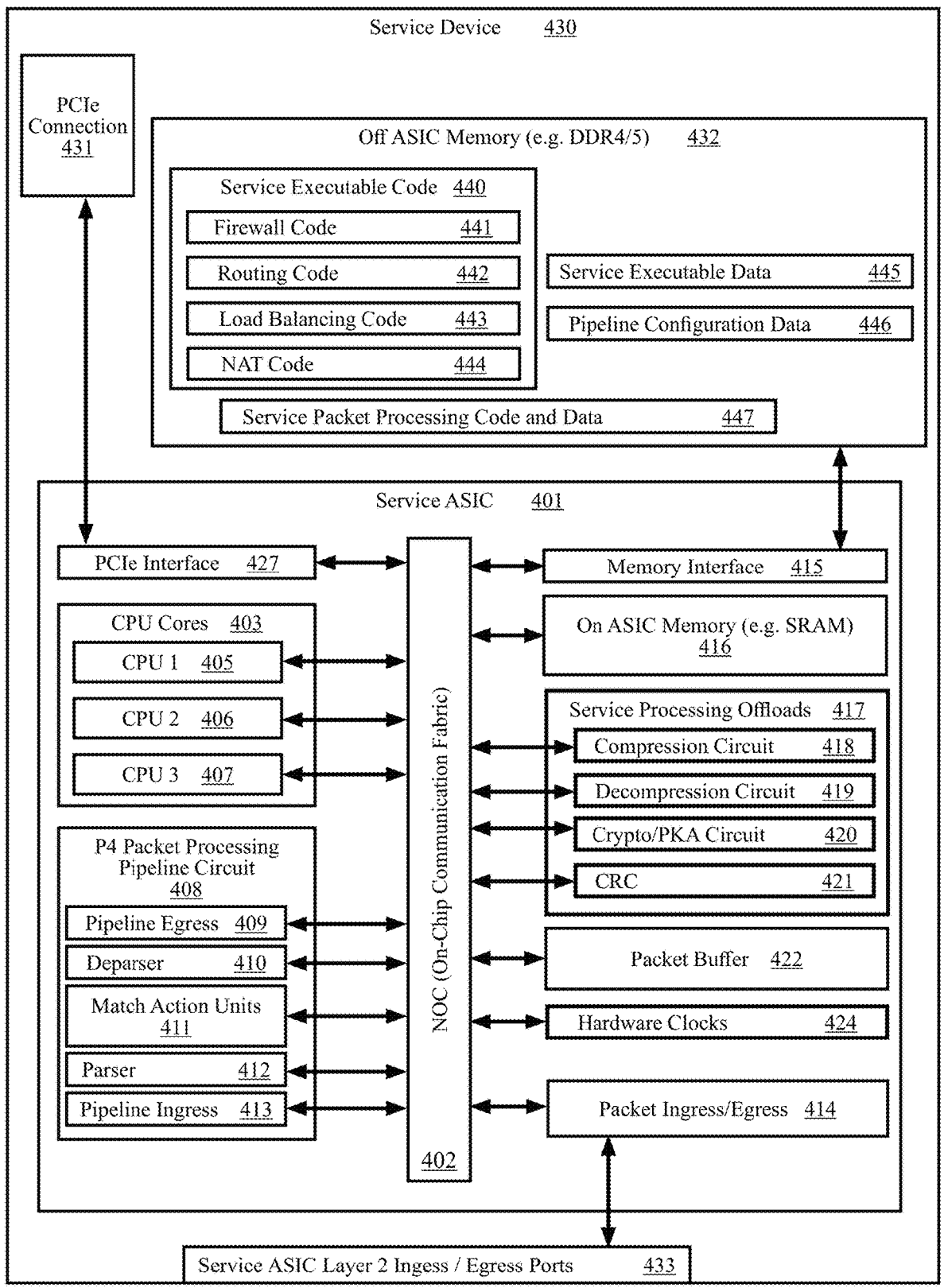
FIG. 4 is a functional block diagram of a service device having a service ASIC, according to some aspects.

FIG. 4 is a functional block diagram of a service device 430 having a service ASIC 401, according to some aspects. The service device can have a PCIe connection 431 for communicating with a CPU external to the service ASIC 401. The service device 430 can have a service ASIC 401, off-ASIC memory 432, and layer 2 ports 433. The off-ASIC memory 432 can be one of the widely available memory modules or chips such as double data rate 4 (DDR4) synchronous dynamic random-access memory (SDRAM) such that the service ASIC has access to many gigabytes of memory on the service device 430. The layer 2 ports 433 provide physical connectivity to the switching device.

The service ASIC 401 can be a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The service ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline circuit 408 can include a pipeline ingress circuit 413, a parser circuit 412, match-action units 411, a deparser circuit 410, and a pipeline egress circuit 409. The service processing offloads 417 are circuits implementing functions that the service ASIC uses so often that the designer has chosen to provide hardware for offloading those functions from the CPUs. The service processing offloads can include a compression circuit 418, decompression circuit 419, a crypto/PKA circuit 420, and a cyclic redundancy check (CRC) calculation circuit 421. The specific core circuits implemented within the non-limiting example of the service ASIC 401 can be selected such that the service ASIC implements many, perhaps all, of the functionality of a service device that processes network traffic flows carried by IP (internet protocol) packets.

A service ASIC can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The P4 packet processing pipeline circuit 408 is a specialized set of elements for processing network packets such as IP (internet protocol) packets and InfiniBand PDUs (protocol data units). The P4 pipeline can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The service device 430 can include a memory 432 for running Linux or some other operating system and for storing data used by the processes implementing network services. A service device that implements network flow tracing within a packet processing pipeline can use the memory 432 to store service executable code 440, service executable data 445, pipeline configuration data 446, and service packet processing code and data 447. The service executable code 440 can be executable code for implementing network services such as firewall code 441, routing code 442, load balancing code 443, and network address translation (NAT) code 444. As such, a smart switch using a service device 430 can act as a firewall, a router, a load balancer, and a NAT appliance. Additional functionality and network services can be provided by additional service executable code 440. Service executable data 445 is data read and written by the service executable code 445. The packet processing pipeline 408 can be configured using configuration data 446 to implement services such as routing, load balancing, firewalling, NATing, etc. The service packet processing code and data 447 can be used for operations related to the redirected packets and reinjected packets such as reading/parsing the redirected packets and writing the reinjected packets. As discussed above, the redirected packets and the reinjected packets use a protocol known by the service device 430. As such, the packet processing pipeline 408 can be configured to parse and operate on the redirected packets and the reinjected packets.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the layer 2 ports 433 to packet processing elements of the data plane and vice-versa. The packet processing elements can include a slow data path implemented in software and a fast data path implemented by packet processing circuit 408.

The packet processing pipeline circuit 408 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the service device. The fast data path is called the fast data path because it processes packets faster than a slow data path that can also be implemented within the service device. An example of a slow data path is a software implemented data path wherein the CPU cores 403 and memory 432 are configured via software to implement a slow data path. A service device having two data paths has a fast data path and a slow data path when one of the data paths processes packets faster than the other data path.

All memory transactions in the service device 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
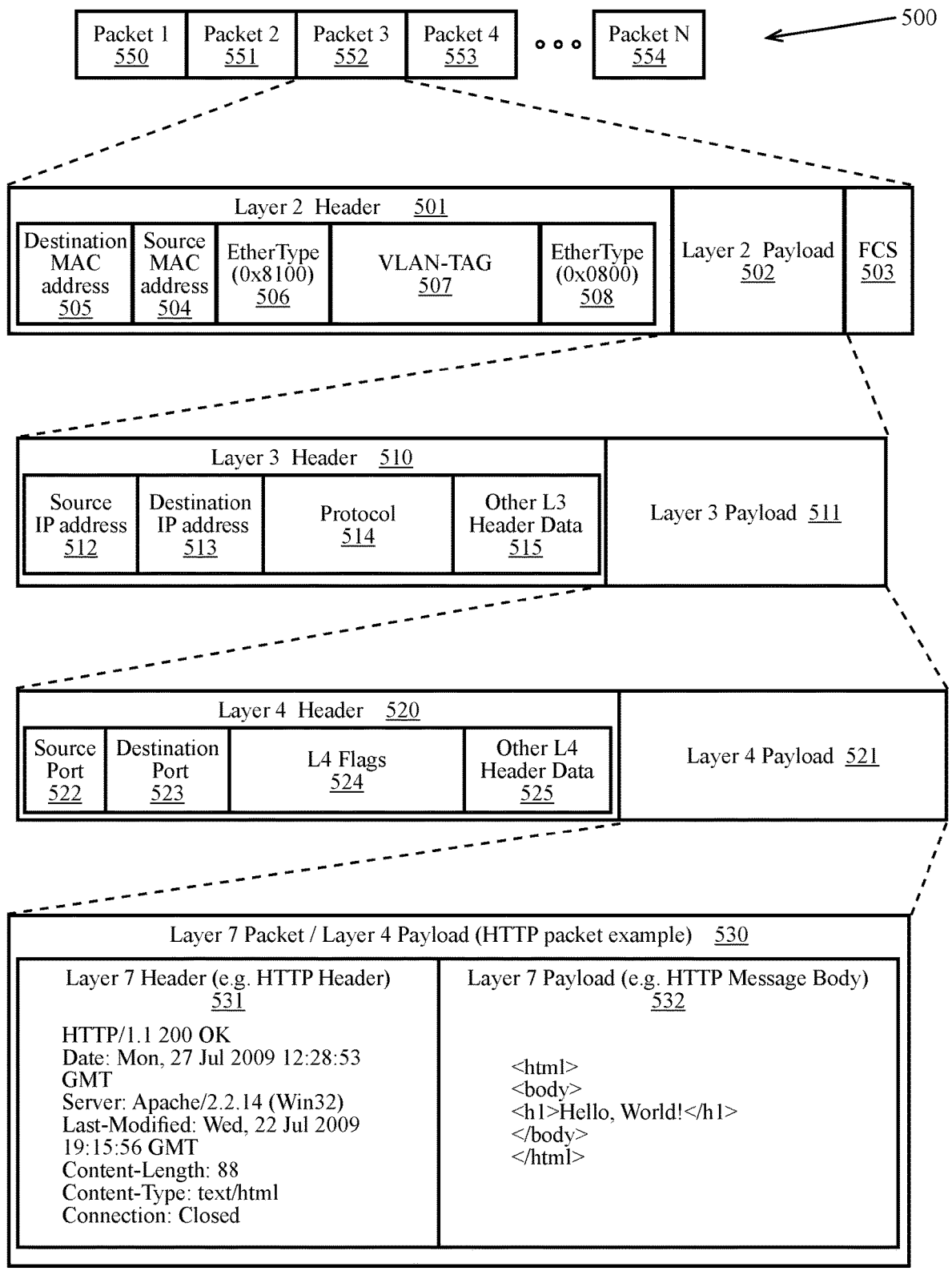
FIG. 5 illustrates packet headers and payloads of packets for network traffic flows including layer 7 fields according to some aspects.

FIG. 5 illustrates packet headers and payloads of packets for a network flow 500 including layer 7 fields according to some aspects. A group of network packets passing from one specific endpoint to another specific endpoint is a network flow. A network flow 500 can have numerous network packets such as a first packet 550, a second packet 551, a third packet 552, a fourth packet 553, and a final packet 554 with many more packets between the fourth packet 553 and the final packet 554. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router or switch. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, an 802.1Q ethertype 506, a VLAN-TAG 507, and an 802.3 ethertype 508. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3, is a layer 2 protocol. IEEE 802.11 (WIFI) is another widely used layer 2 protocol. The layer 2 payload 502 can include a layer 3 packet. The layer 2 FCS 503 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The format and data in the 802.1Q ethertype 506 field and VLAN-TAG field 507 are specified by the IEEE 802.1Q standard. The 802.1Q ethertype is the two-octet value 0x8100 that indicates that the VLAN-TAG field 507 is present. The standardized VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 510 and a layer 3 payload 511. The layer 3 header 510 can have a source IP address 512, a destination IP address 513, a protocol indicator 514, and other layer 3 header data 515. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 511 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 510 using protocol indicator 514. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 511 includes a TCP header and a TCP payload. UDP can provide for computer applications to send messages, in this case referred to as datagrams, to other hosts on an IP network using a connectionless model. When carrying UDP data, a layer 3 payload 511 includes a UDP header and a UDP payload. ICMP is used by network devices, including routers, to send error messages and operational information indicating success or failure when communicating with another IP address. ICMP uses a connectionless model.

A layer 4 packet can have a layer 4 header 520 and a layer 4 payload 521. The layer 4 header 520 can include a source port 522, destination port 523, layer 4 flags 524, and other layer 4 header data 525. The source port and the destination port can be integer values used by host computers to deliver packets to application programs configured to listen to and send on those ports. The layer 4 flags 524 can indicate a status of or action for a network traffic flow. A layer 4 payload 521 can contain a layer 7 packet. Note that the source port 522 and the destination port 523 are IP ports and are not to be confused with the hardware ports (e.g., ingress ports and egress ports) of switching devices, service devices, network appliances, etc.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 521 may include a layer 7 packet 530. A layer 7 packet can have a layer 7 header 531 and a layer 7 payload 532. The illustrated layer 7 packet is an HTTP packet. The layer 7 header 531 is an HTTP header, and the layer 7 payload 532 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 6:
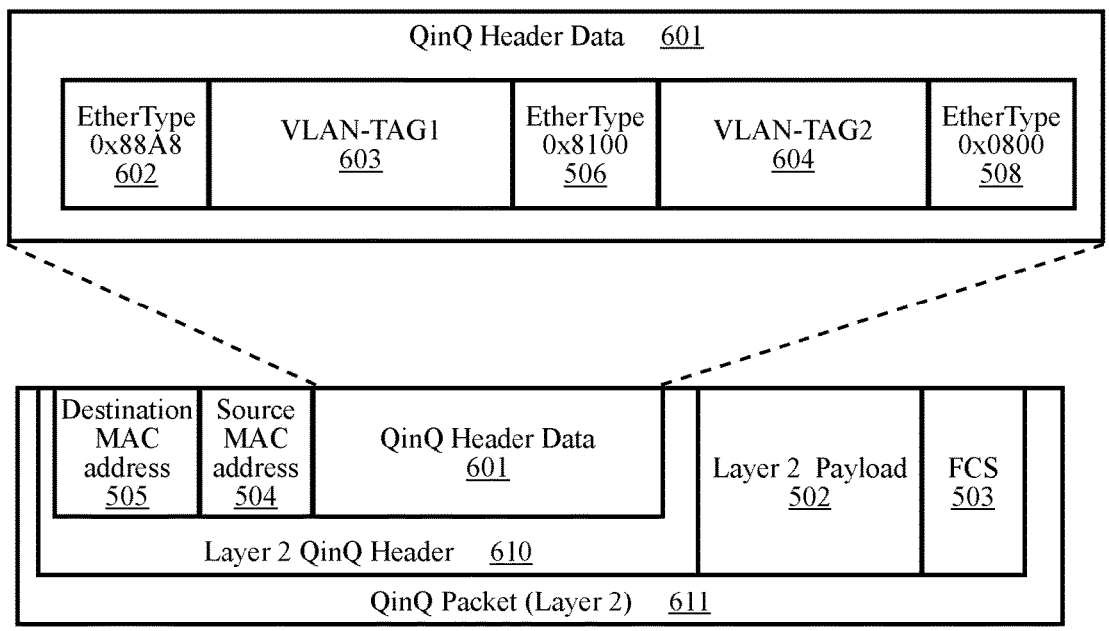
FIG. 6 illustrates a format of a QinQ packet that may be used to implement some aspects.

FIG. 6 illustrates a format of a QinQ packet 611 that may be used to implement some aspects. IEEE 802.1ad is the networking standard informally known as QinQ. QinQ allows multiple VLAN tags to be inserted in a single layer 2 packet. The QinQ packet 611 has a layer 2 QinQ header 610, a layer 2 payload 502, and a FCS 503. The layer 2 QinQ header 610 includes a destination MAC address 505, a source MAC address 504, and QinQ header data 601. The QinQ header data 601 includes a QinQ ethertype 602, a VLAN-TAG1 field 603, an 802.1Q ethertype 506 a VLAN-TAG2 field 604, and an 802.3 ethertype 508. Those practiced in network configuration and protocols are familiar with QinQ packets and the QinQ protocol.

Figure 7:
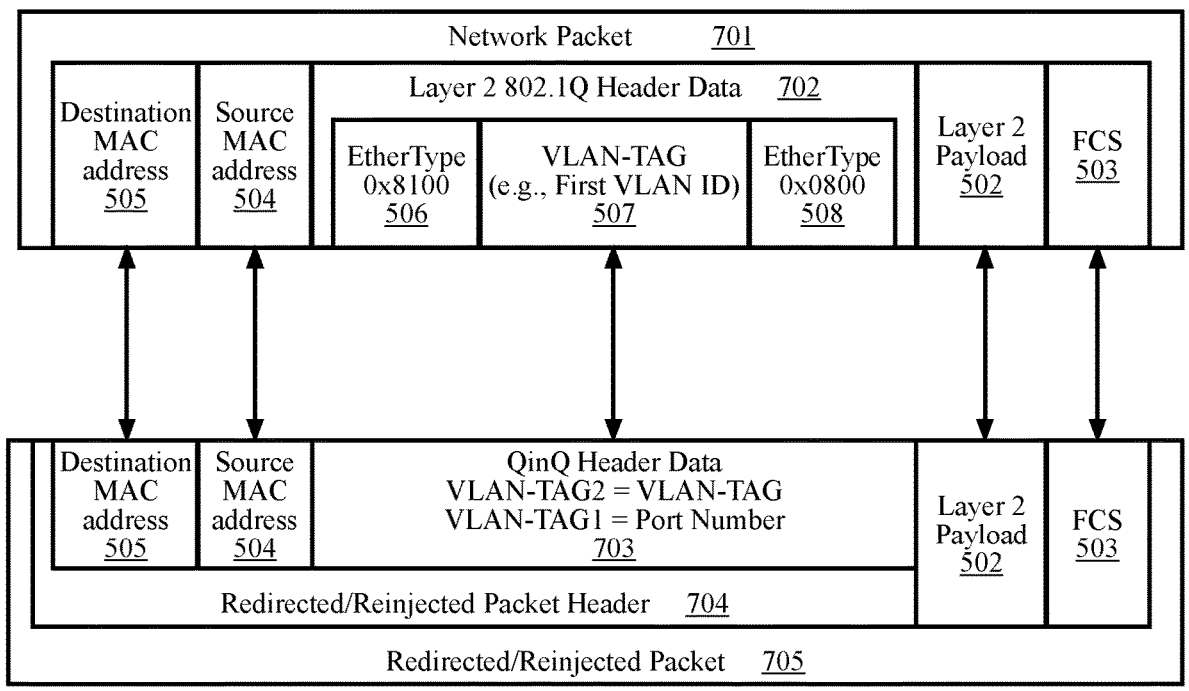
FIG. 7 illustrates a relationship between a network packet that includes an 802.1Q header data and a redirected or reinjected packet that includes a QinQ header data.

FIG. 7 illustrates a relationship between a network packet 701 that includes an 802.1Q header data and a redirected or reinjected packet 705 that includes a QinQ header data. It is important to note here that redirected packets and reinjected packets that use the QinQ protocol are not using the QinQ protocol for its intended purpose because the VLAN-TAG1 field and the VLAN-TAG2 field may carry data that is not a VLAN identifier. The data in the VLAN_TAG1 field and/or the VLAN-TAG2 field may include any data that is to be used by the switching device. For example, the switching device may include a table that can be used to recover a VLAN identifier and/or a port identifier based on a value in the VLAN_TAG1 field and/or a value in the VLAN-TAG2 field. The network packet 701 is similar to the layer 2 packet of FIG. 5. A switch can receive the network packet. The network packet 701 includes layer 2 802.1Q header data 702 wherein the VLAN-TAG field can be a first VLAN identifier. A switch that includes only a switching device can use information such as the VLAN identifier, the port identifier of the port that received the network packet, etc. to forward the packet. Forwarding a layer 2 packet, as discussed above, involves selecting a layer 2 destination, selecting an egress port, rewriting the source MAC and destination MAC fields, and transmitting the packet.

A network appliance that also has a service device can use the service device to process the network packet. Such a network appliance can receive a network packet 701 on an ingress port that has a port number, produce a redirected packet 705 from the network packet 701, and use a service port to send the redirected packet to the service device. The redirected packet 705 has a redirected packet header 704 that includes QinQ header data 703. The data in the VLAN-TAG field 507 (e.g., a VLAN identifier) can be copied into the VLAN-TAG2 field of the QinQ header data 703. The port identifier for the ingress port that received the network packet 701 can be placed in the VLAN-TAG1 field of the QinQ header data 703. The redirected packet can then be sent to a service device via a service port. The service device can process the redirected packet and send the switching device a reinjected packet that is responsive to the redirected packet.

The switching device receives the reinjected packet via a service port. The reinjected packet can include QinQ header data 703 that may be the same as that in the redirected packet or may be set by one or more of the services running in the service device. The switching device may then produce a new network packet by copying the data in the VLAN-TAG2 field into the VLAN-TAG field. The data in the VLAN-TAG1 field can be copied into packet metadata that the switching device has for each network packet. For example, the packet metadata often includes the port number of the ingress port and the switching device makes switching decisions based at least in part on the packet metadata. The data in the VLAN-TAG1 field can be copied into the ingress port number field of the packet metadata for the new network packet. Recalling the P4 pipeline discussed above, the switching device can include a P4 pipeline that parses layer 2 and layer 3 header data to produce a PHV that is the packet metadata. The switching device may then process the new network packet as it would any other network packet. A "serviced flag" may be set in the metadata of network packets produced from a reinjected packet. The serviced flag may prevent a packet from being recirculated through the service device.

Figure 8:
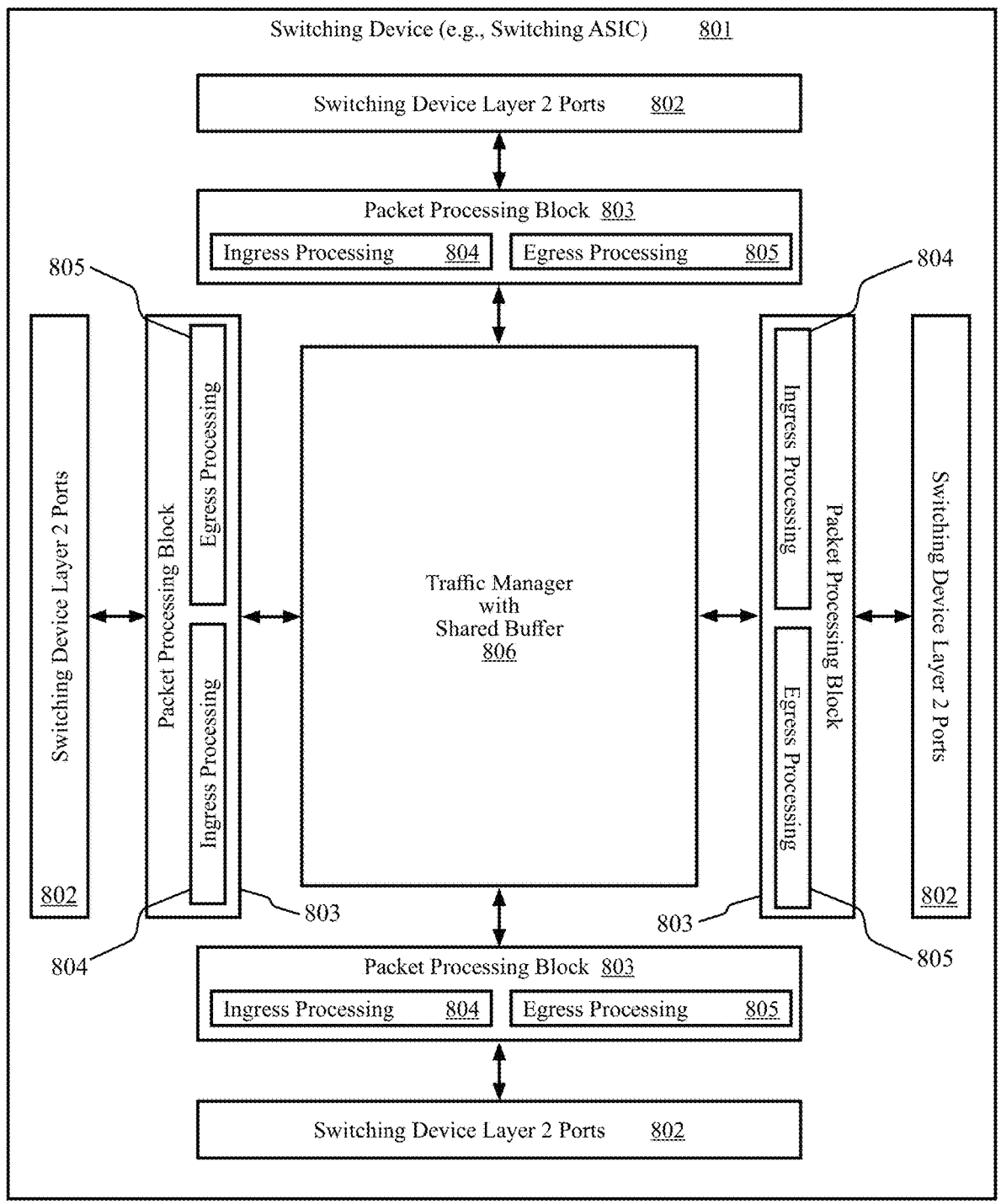
FIG. 8 illustrates a switching device that may be used to implement some aspects.

FIG. 8 illustrates a switching device 801 that may be used to implement some aspects. The switching device 801 can have a large number of switching device layer 2 ports 802, packet processing blocks 803, and a traffic manager with a shared buffer 806. The switching device layer 2 ports 802 can be ethernet ports that transmit and receive ethernet packets. Packets received by the switching device layer 2 ports 802 can be passed to the packet processing blocks 803 for ingress processing 804 and then passed to the traffic manager 806. The traffic manager can inspect the layer 2 data, the layer 3 data, and the metadata associated with a packet and make a forwarding decision. The forwarding decision includes deciding which layer 2 port is to transmit the packet and how the layer 2 information is to be rewritten. The packet is then passed to the appropriate packet processing block 803 for egress processing 805 before the packet is transmitted via the switching device layer 2 ports 802.

Figure 9:
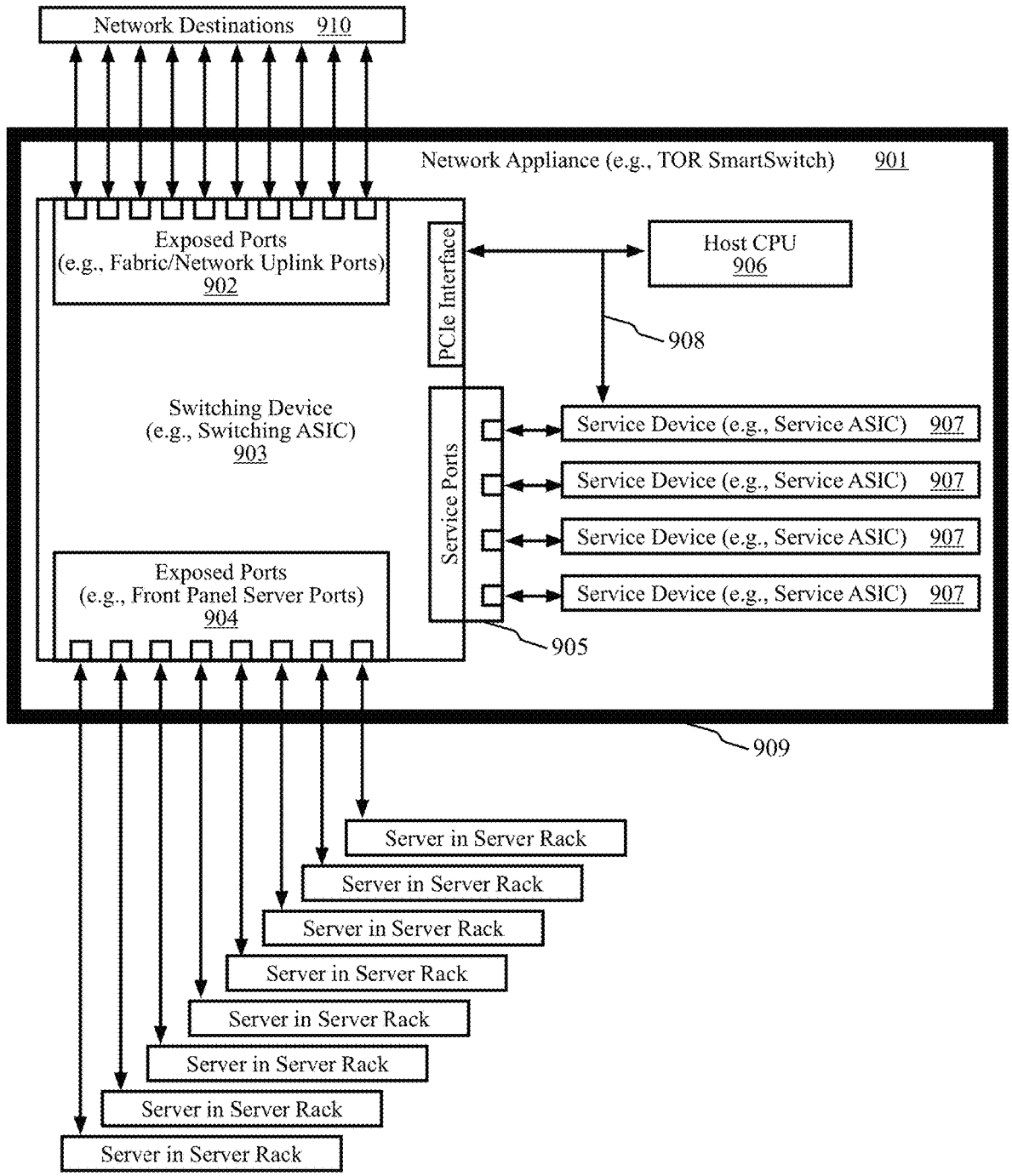
FIG. 9 is a high-level system diagram illustrating using a network appliance that can use service devices for processing network packets.

FIG. 9 is a high-level system diagram illustrating using a network appliance 901 that can use service devices for processing network packets. The network appliance, which may be called a smart switch, is shown as a ToR switch that processes network traffic passing between servers installed in a server rack and network destinations 910 outside the server rack. The network appliance includes a switching device 903, service devices 907, and a host CPU 906 inside an enclosure 909. The host CPU 906 can use a PCIe bus 908 to communicate with the switching device 903 and the service devices 907. The network appliance 901 has exposed ports 902 for communicating with the network destinations 910 and has exposed ports 904 for communicating with the servers in the server rack. The end user who configures the network, the servers, etc. can configure the exposed ports. The exposed ports of the network appliance are the exposed ports of the switching device 903. The switching device also has ports that are not exposed and that may not be configurable by the end user. The service ports 905 are not exposed ports. The service ports 905 are used by the switching device 903 to exchange redirected packets and reinjected packets with the service devices 907.

The illustrated network appliance shows the host CPU 906 using the service devices for network connectivity. The network appliance can have an appliance IP address that is used for communicating with the network appliance itself. Packets sent to the appliance IP address may be intended for the host CPU 906. In processing a network packet sent to the appliance IP address, the switching device may set a host CPU destination indicator in the redirected packet. As such, a service device can implement a set of host CPU specific firewall rules and other host CPU specific services (deep packet inspection, cryptographic security, etc.) to ensure that the host CPU is not compromised. The host CPU firewall rules other host CPU services that are specifically used for communications with the host CPU may be protected from configuration and manipulation by the end user.

By including the service devices and the switching device inside the enclosure, the network appliance removes the need for the user to connect the service devices to the switching device, to configure the service ports, to provision the service devices with IP addresses, etc. Some embodiments may include an internal IP network that is used for communicating internal traffic between two or more of the switching device, the service devices, and the host CPU.

The switching device 903, the host CPU, and the service devices 907 can be internal components of the network appliance. The internal components can be mounted on a printed circuit board (PCB) that is inside the enclosure 909. Traces on the PCB can connect the service ports to the switching devices and can connect the host CPU port to the host CPU. The internal components can be mounted to two or more PCBs inside the enclosure 909 wherein the traces of the one PCB are connected to the traces of another PCB via PCB interconnects (e.g., card edge connectors, ribbon cables, etc.). Traces on the PCBs and the PCB interconnects can connect the service ports to the switching devices and can connect the host CPU port to the host CPU.

External network traffic can pass into and out of the network appliance via wire/fiber transmission media attached to media access ports on the network appliance. An end user may attach the wire/fiber transmission media to the media access ports using physical connectors (e.g., RJ45, SFP, SFP+, . . . ) and may also detach the wire/fiber transmission media from the media access ports. The exposed ports of the switching device can be electrically connected to the media access ports. As such, external network traffic passes into and out of the network appliance via the media access ports and the exposed ports.

Figure 10:
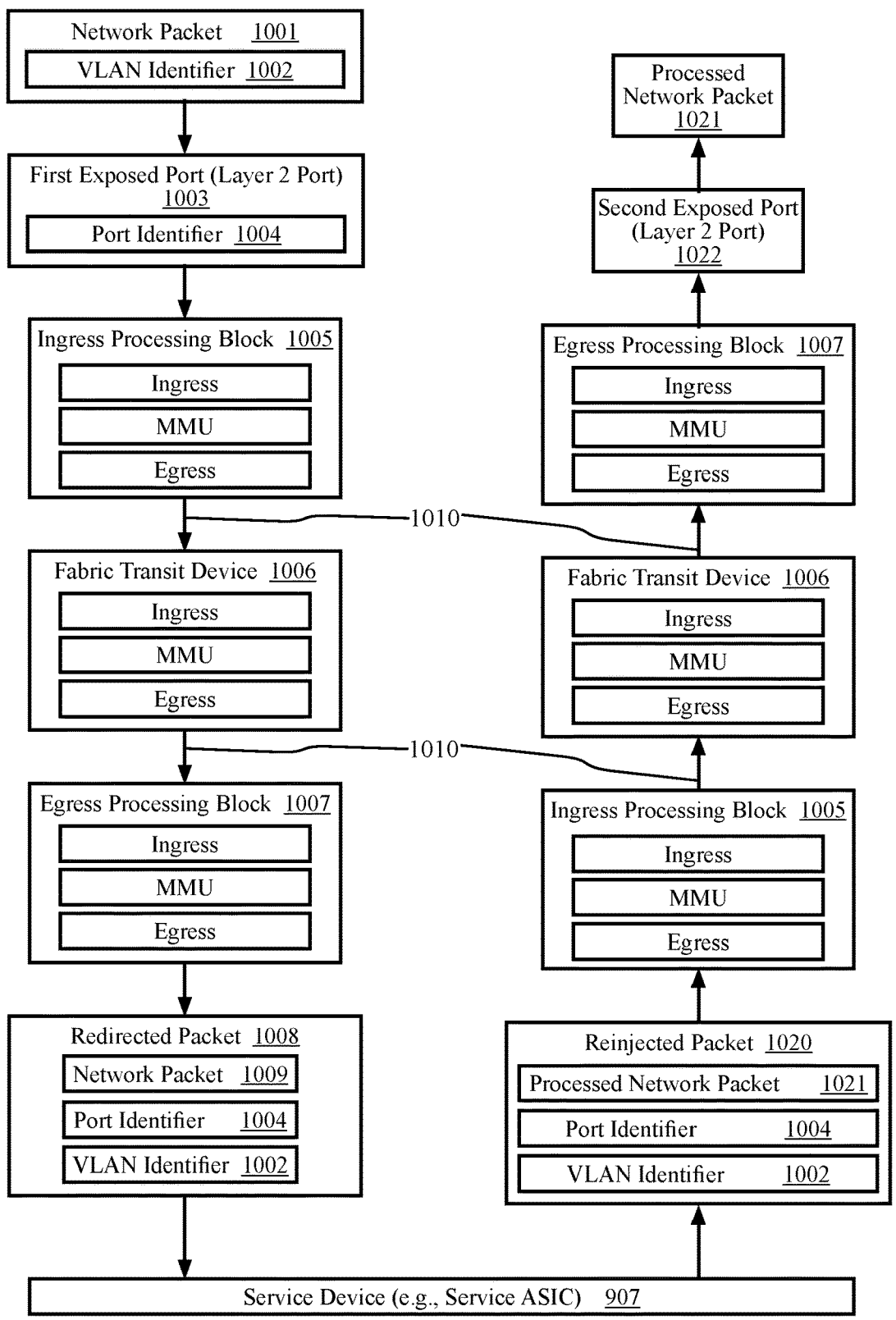
FIG. 10 is a high-level conceptual diagram of a smart switch using a service device to process a network packet according to some aspects.

FIG. 10 is a high-level conceptual diagram of a smart switch using a service device to process a network packet according to some aspects. The switching device operations described here may be performed by a commercially available switching device when that switching device is configured for operation within a smart switch as described herein. Furthermore, FIG. 10 shows the packet passing through the switching device twice, first as a network packet 1001, then as a processed network packet 1021. The network packet 1001 which includes a VLAN identifier 1002 is received at a first exposed port 1003 of the smart switch (a.k.a. network appliance) which is also an exposed port of the switching device. A port identifier 1004 identifies the first exposed port 1003. The network packet is submitted to an ingress processing block 1005. The ingress processing block 1005 can have stages such as ingress, memory management unit (MMU), and egress. Ingress prepares the packet for processing within a processing block, MMU handles scheduling and queueing within the block, egress formats the packet for transmission to the next block and submits it to the next block. The ingress processing block can parse the initial fields of the packet (L2 and L3 fields), perform L2 and L3 lookup, and perform limited access control list (ACL) processing. The ingress processing block can submit the packet to the fabric transit device 1006 as an internally formatted packet 1010. The internally formatted packet can be a combination of the network packet and packet metadata such as a HiGig packet, HiGig2 packet, etc.

The fabric transit device 1006 can determine which port (or ports for multicast or broadcast) is to forward the packet. The determination can be made based on the metadata which can include VLAN identifier 1002, port identifier 1004, source IP, destination IP, etc. The fabric transit device 1006 can then submit packet to the egress processing block 1007 as an internally formatted packet 1010. It is the fabric transit device 1006 that can determine that the packet is to be forwarded on a service port.

The egress processing block 1007 can perform packet modification and limited ACL processing before the packet is sent out the port specified for egress in the packet metadata. It is the egress processing block that can create a redirected packet 1008 such as a QinQ packet that includes the network packet, the port identifier 1004 in the VLAN-TAG1 field, and the VLAN identifier in the VLAN-TAG2 field. The service device receives the redirected packet and processes it to produce a processed network packet 1021 that is sent back the switching device in a reinjected packet 1020. The reinjected packet 1020 is illustrated as having the same port identifier 1004 and VLAN identifier 1002 as the redirected packet 1008. The service device may alternatively provide other values as the port identifier and VLAN identifier. In some implementations, the redirected packet (and reinjected packet) can be in a format such as HiGig, HiGig2, HiGig+, or another format in the HiGig protocol family.

The switching device receives the reinjected packet 1020 and submits it to the ingress processing block 1005. The ingress processing block 1005 can be configured to write values from the packet fields into the metadata. For example, the ingress processing block 1005 can copy the value in the VLAN-TAG1 field of a QinQ packet received on a service port into the ingress port field of the packet meta data. The ingress processing block 1005 then submits the packet to the fabric transit device 1006 which makes switching decisions and then submits the packet to the egress processing block 1007. The egress processing block may then forward the processed network packet 1021 toward the destination determined by the fabric transit device 1006.

Figure 11:
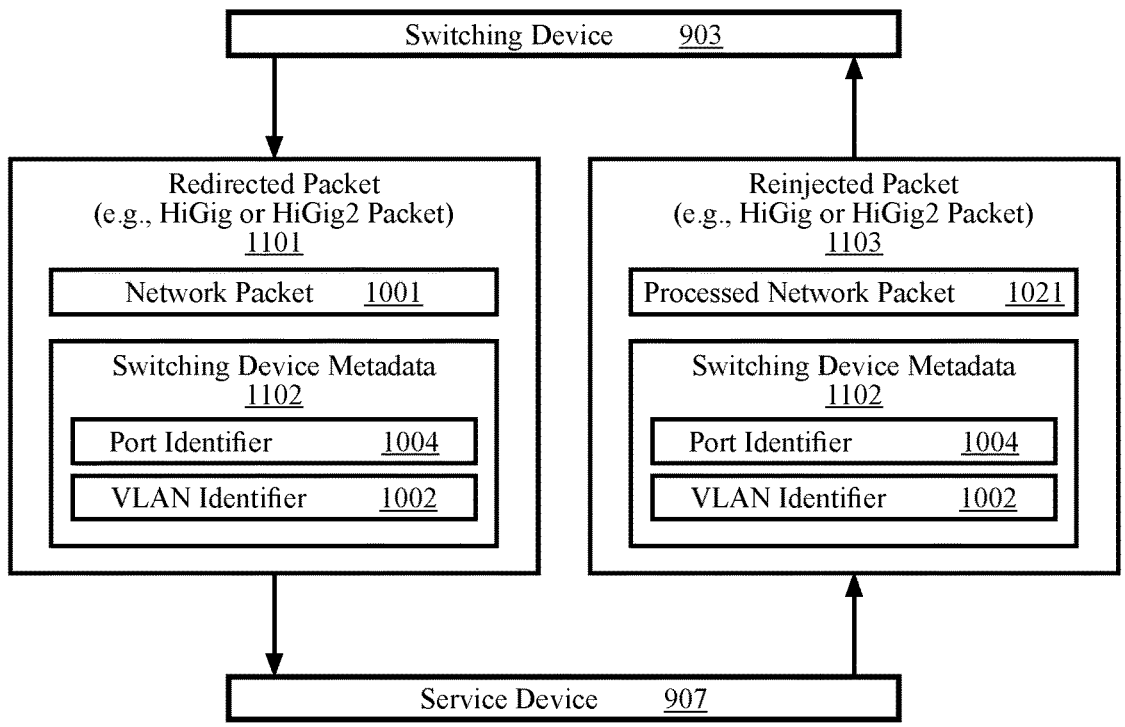
FIG. 11 is a high-level diagram illustrating a switching device that sends redirected packets to a service device that sends reinjected packets to the switching device according to some aspects.

FIG. 11 is a high-level diagram illustrating a switching device 903 that sends redirected packets to a service device 907 that sends reinjected packets to the switching device according to some aspects. As discussed above, the redirected packet and the reinjected packet can use a protocol such as QinQ or can use a different protocol such as a protocol in the HiGig protocol family. The HiGig protocol family includes the HiGig protocol, the HiGig2 protocol, and the HiGig+ protocol. Those practiced in the art of switching ASICs are familiar with protocols in the HiGig protocol family. The redirected packet 1101 includes a network packet 1001 and switching device metadata 1102. The switching device metadata include a port identifier 1004 and a VLAN identifier 1002. As discussed above, the service device 907 can process the network packet 1001 and thereby produce the processed network packet 1021. The reinjected packet 1103 includes a processed network packet 1021 and switching device metadata 1102.

Figure 12:
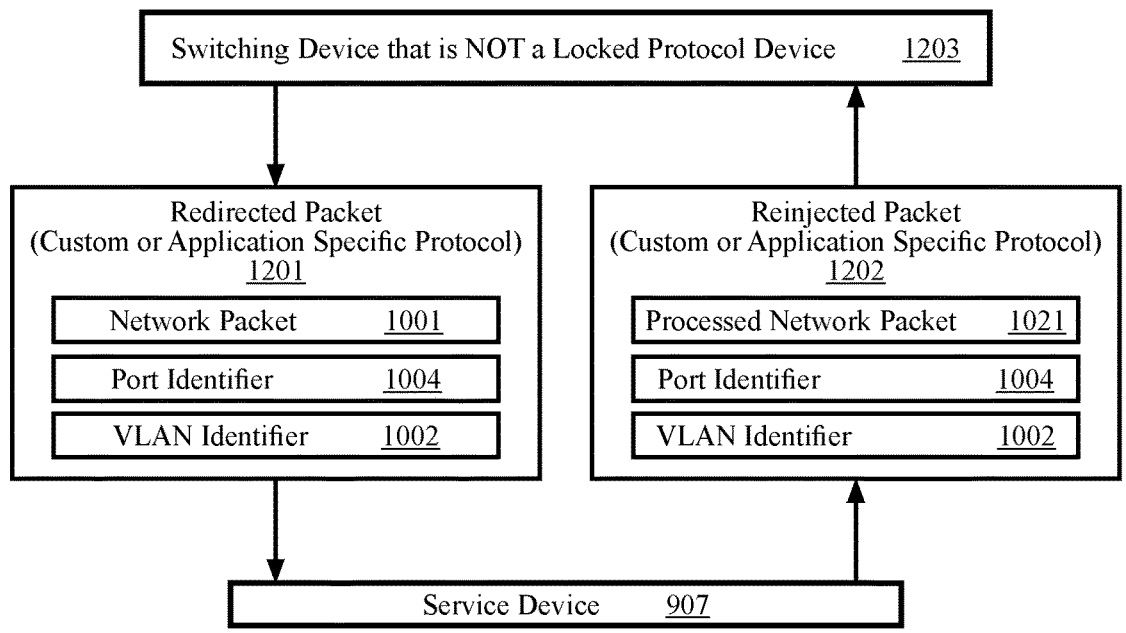
FIG. 12 is a high-level diagram illustrating a switching device that is not a locked protocol device that sends redirected packets to a service device that sends reinjected packets to the switching device according to some aspects.

FIG. 12 is a high-level diagram illustrating a switching device that is not a locked protocol device that sends redirected packets to a service device that sends reinjected packets to the switching device according to some aspects. A locked protocol device is a device that implements only a specific set of protocols. Users of a locked protocol device, such as a smart switch manufacturer that uses a locked protocol device produced by an upstream manufacturer, are unable to implement additional protocols on the locked protocol device. When the switching device is a locked protocol device, the redirected packet and the reinjected packet must use one of the protocols that the switching device implements. Some switching devices are not locked protocol devices. For example, a switching ASIC can use a configurable packet processing pipeline such as a P4 packet processing pipeline. Such switching devices can be configured to implement additional or new protocols such as custom protocols, etc. The switching device can therefore be configured to produce redirected packets that include whatever data fields are desired in whatever order is desired. Similarly, the switching device can be configured to process reinjected packets that include whatever data fields are desired in whatever order is desired. The service device, which may also include a configurable packet processing pipeline such as a P4 packet processing pipeline, may also produce and process redirected packets and reinjected packets. It is safe to use such protocols inside the network appliance 901 because the packets may never exit the network appliance 901. As such, only devices that are aware of the protocol used will send or receive packets using that protocol.

A switching device that is not a locked protocol device 1203 can send a redirected packet 1201 to the service device 907. The redirected packet 1201 can use a custom or application specific protocol and can include a network packet 1001, the port identifier 1004, the VLAN identifier 1002, and whatever other fields are available using the custom protocol. The service device 907 can send a reinjected packet 1202 to the switching device that is not a locked protocol device 1203. The reinjected packet 1202 can use a custom or application specific protocol and can include a processed network packet 1021, the port identifier 1004, the VLAN identifier 1002, and whatever other fields are available using the custom protocol.

Figure 13:
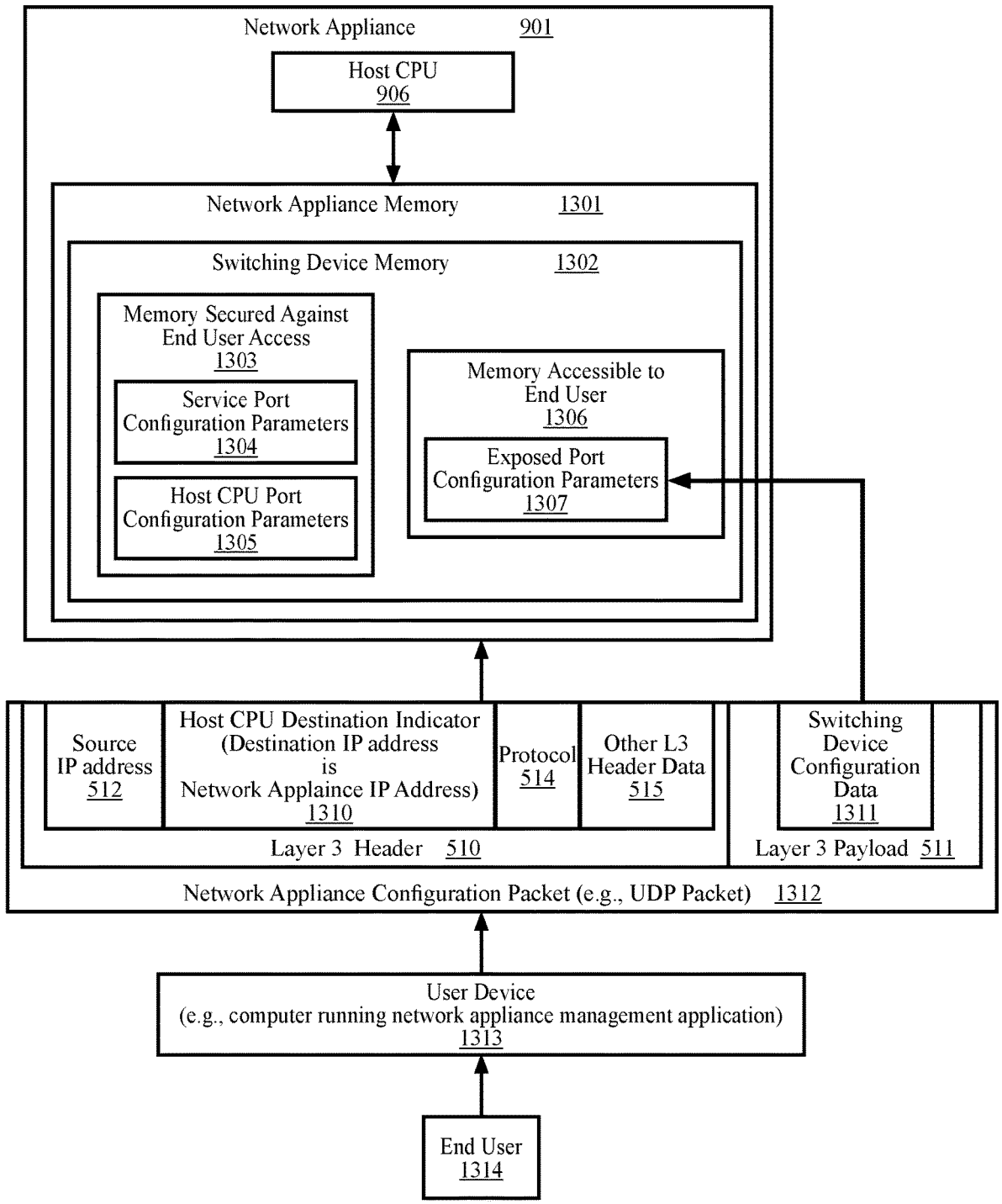
FIG. 13 is a high-level diagram illustrating a network appliance with user configurable exposed ports, service ports that are not user configurable, and a host CPU port that is not user configurable according to some aspects.

FIG. 13 is a high-level diagram illustrating a network appliance 901 with user configurable exposed ports, service ports that are not user configurable, and a host CPU port that is not user configurable according to some aspects. The network appliance 901 can include network appliance memory 1301 that can include switching device memory 1302. The switching device memory 1302 can include two memory sections. The first memory section can be memory that is secured against end user access 1303. The second memory section can be memory that is accessible to an end user 1314. Those practiced in computer hardware are aware of many ways to lock down access to data stored in memory such that it can only be changed by an authorized entity. The end user 1314 can be a network administrator or other entity that uses and manages the network appliance 901 in a data center. The memory that is secured against end user access 1303 can include service port configuration parameters 1304, CPU port configuration parameters, and other data for managing the communications between the switching device and other devices inside the network appliance such as the service devices and the host CPU. The memory accessible to the end user 1306 can include exposed port configuration parameters 1307, and other data for managing the communications between the network appliance 901 and devices external to the network device. The two memory sections are used such that the entity that manufactures and services the network appliance can manage communications inside the network appliance while the end user 1314 can manage communications on a computer network that includes the network appliance. Here, the host CPU communicates with the switching device using one of the switching device's hardware ports. As such, the switching device has exposed ports for outside communications, service ports for communicating with the service devices, and a CPU port for communication with the host CPU. The service ports and the host CPU ports are not exposed ports.

The end user 1314 can manage and configure the exposed ports by using a user device 1313 that may be a personal computer, tablet computer, smart phone, etc. The user device 1313 may send a network appliance configuration packet 1312 to the network appliance 901. The network appliance configuration packet 1312 can include a host CPU destination indicator 1310 and switching device configuration data 1311. For example, the network appliance configuration packet 1312 may be a UDP packet and the host CPU destination indicator 1310 can be the UDP packet's destination IP address. The destination IP address can be the network appliance's IP address. The switching device configuration data 1311 can be data in the UDP packet payload.

Figure 14:
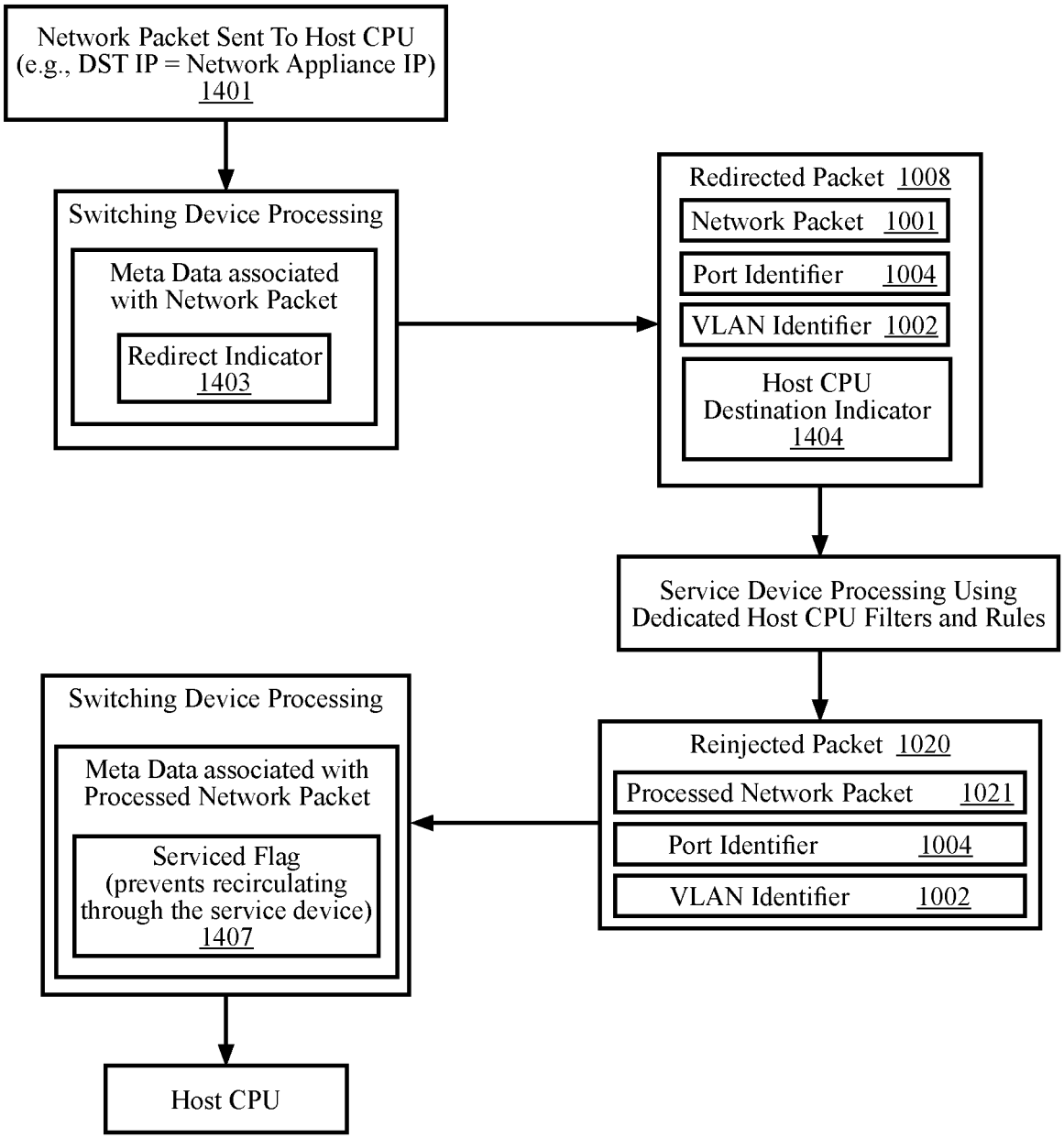
FIG. 14 illustrates a nonlimiting example of a service device using dedicated filters and rules for processing packets being sent to a host CPU according to some aspects.

FIG. 14 illustrates a nonlimiting example of a service device using dedicated filters and rules for processing packets being sent to a host CPU according to some aspects. A network packet 1401 can be sent to the host CPU. The switching device can receive the network packet 1401 and parse the network packet to produce metadata associated with the network packet. Upon determining that the network packet is being sent to the host CPU (e.g., the destination address is the network appliance's IP address) the switching device can set a redirect indicator 1403 in the metadata. The redirect indicator flags the network packet for processing by a service device. As such, the switching device produces a redirect packet. The switching device can produce a redirected packet 1008 that includes the network packet 1001, the port identifier 1004, the VLAN identifier 1002, and a host CPU destination indicator 1404. The host CPU destination indicator 1404 can be the destination address of the network appliance or host CPU or can be some other flag, data field, or indicator. The service device can be configured with strict rules regarding communications with the host CPU such as which IP ports may be used, which protocols may be used, trusted security keys that may be used, and other rules. The purpose of the strict rules is that the manufacturer of the network appliance may want to severely restrict access to the host CPU. Many of the rules restricting access to the host CPU may be inaccessible to the end user such that the end user cannot rewrite the rules and thereby gain less restricted access to the host CPU. The service device may drop packets that do not meet the requirements for being passed to the CPU. In some embodiments, the service device may provide the network packet to the host CPU via a PCIe bus. In other embodiments, the service device may create a reinjected packet 1020 that is sent to the switching device. The metadata for all packets received via a service port can include a serviced flag 1407. Alternatively, the redirected packet 1020 may include a serviced flag that is copied into the processed network packet's metadata. The serviced flag can inform the switching device that a packet is not to be sent to a service device, but is instead to be dropped or sent from a port that is not a service port. Here, the packet is sent out the host CPU port such that it can be received by the host CPU.

Figure 15:
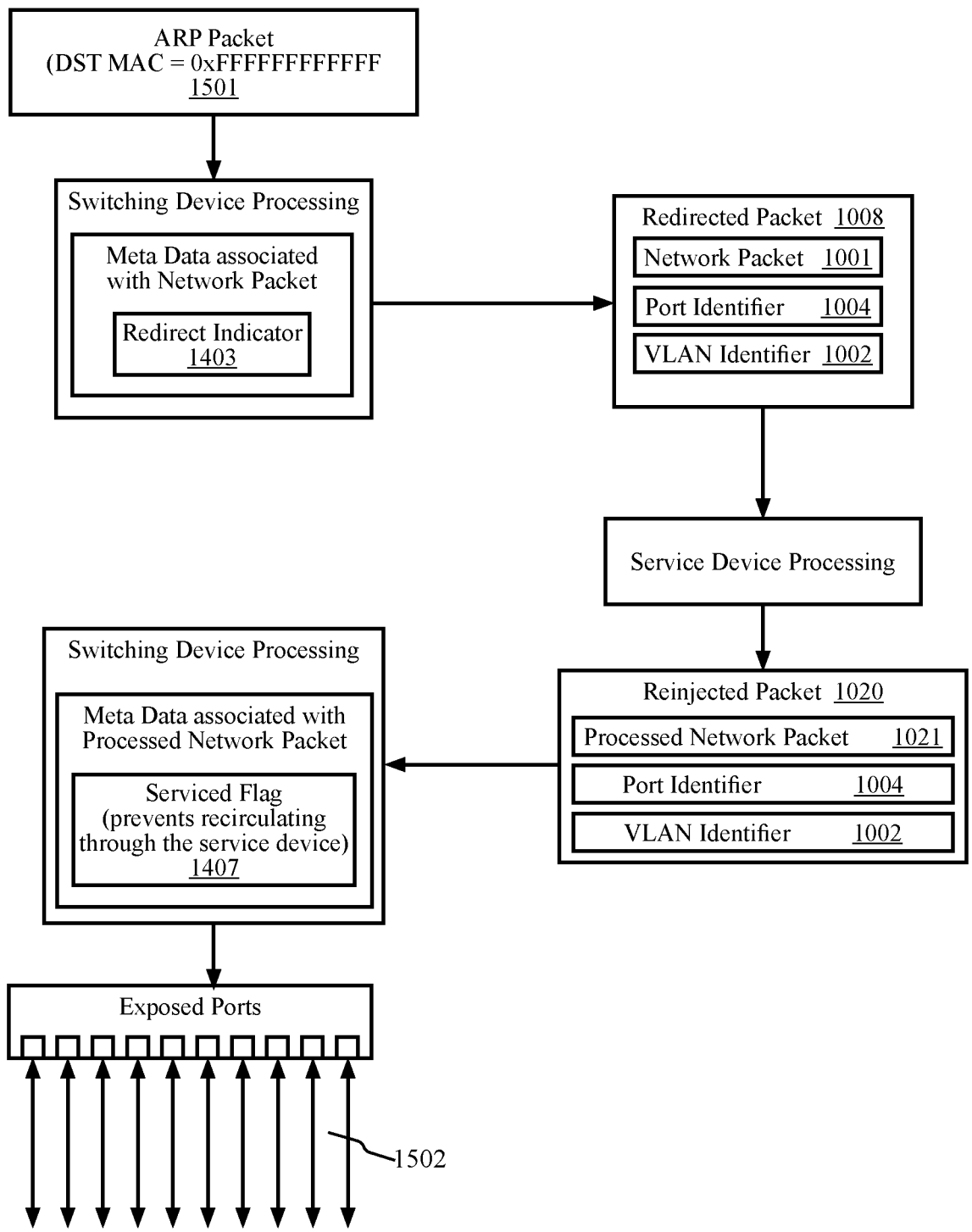
FIG. 15 is a high-level block diagram illustrating an example of preventing packet recirculation by using a serviced flag according to some aspects.

FIG. 15 is a high-level block diagram illustrating an example of preventing packet recirculation by using a serviced flag 1407 according to some aspects. Some network packets do not have a specific destination. An address resolution protocol (ARP) packet is an example of such a packet. One of the issues that can arise with ARP packets is "ARP storms" in which network devices recirculate the packet to one another while broadcasting the ARP packet to every other device on the network. Such issues can be mitigated within the network appliance 901 by using a serviced flag. The issue is that the traffic and management buffer 806 may broadcast a packet such as an ARP packet to many egress ports, the service devices may respond to the ARP packets, etc. Setting the serviced flag can prevent the packets from being recirculated back to the service device, thereby mitigating the onset of problems such as ARP storms. In some embodiments, the serviced flag may be set by the switching device for packets received on a service port, some other embodiments may have reinjected packets that include a serviced flag field. The value in the serviced flag field may be copied into the packet meta data as a serviced flag.

Figure 16:
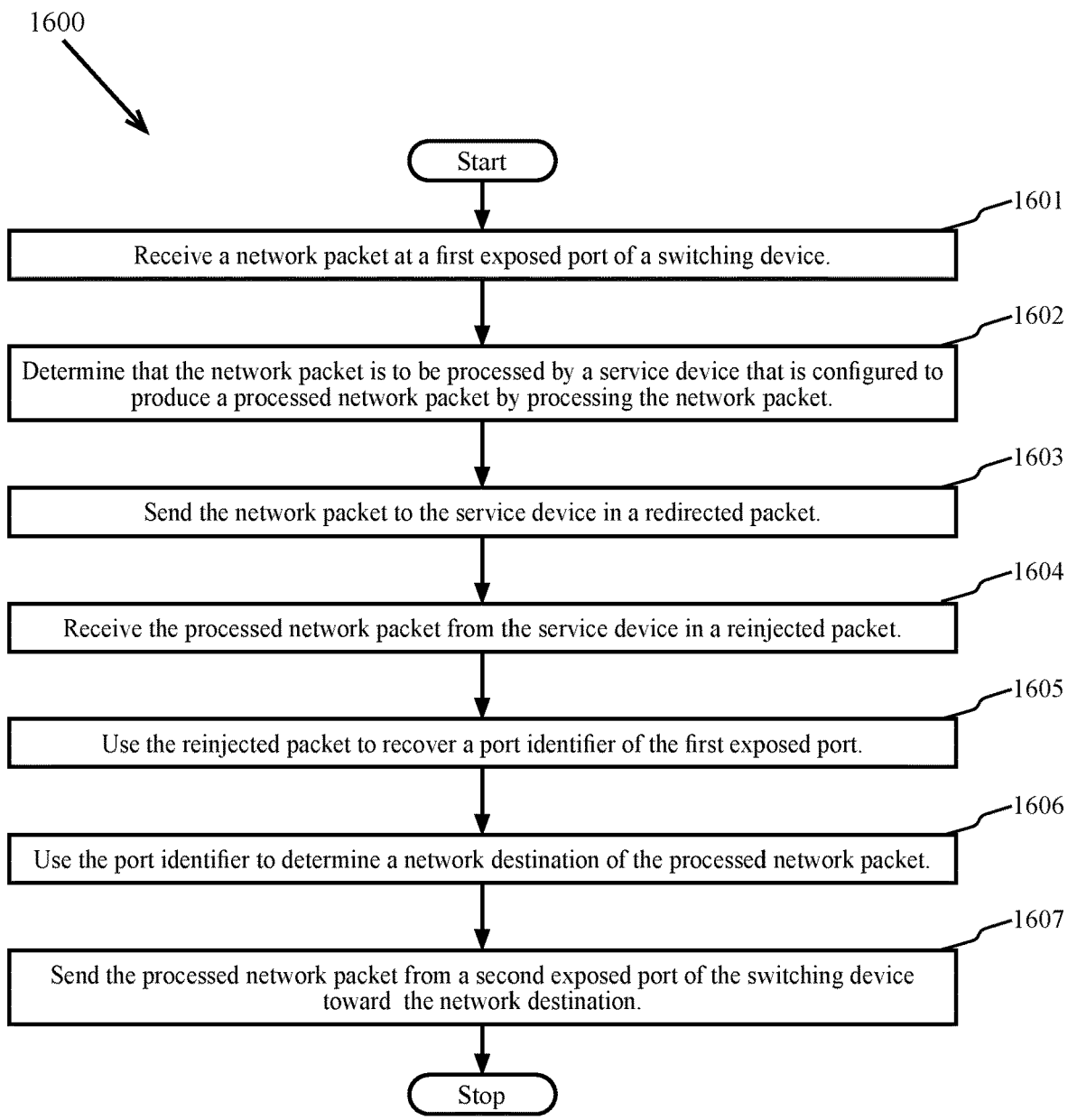
FIG. 16 is a high-level flow diagram illustrating a method for processing network packets using a service device in a smart switch according to some aspects.

FIG. 16 is a high-level block diagram illustrating a method for processing network packets using a service device in a smart switch 1600 according to some aspects. After the start, at block 1601 the method can receive a network packet at a first exposed port of a switching device. At block 1602 the method can determine that the network packet is to be processed by a service device that is configured to produce a processed network packet by processing the network packet. At block 1603 the method can send the network packet to the service device in a redirected packet. At block 1604 the method can receive the processed network packet from the service device in a reinjected packet. At block 1605 the method can use the reinjected packet to recover a port identifier of the first exposed port. At block 1606 the method can use the port identifier to determine a network destination of the processed network packet. At block 1607 the method can send the processed network packet from a second exposed port of the switching device toward the network destination.

Figure 17:
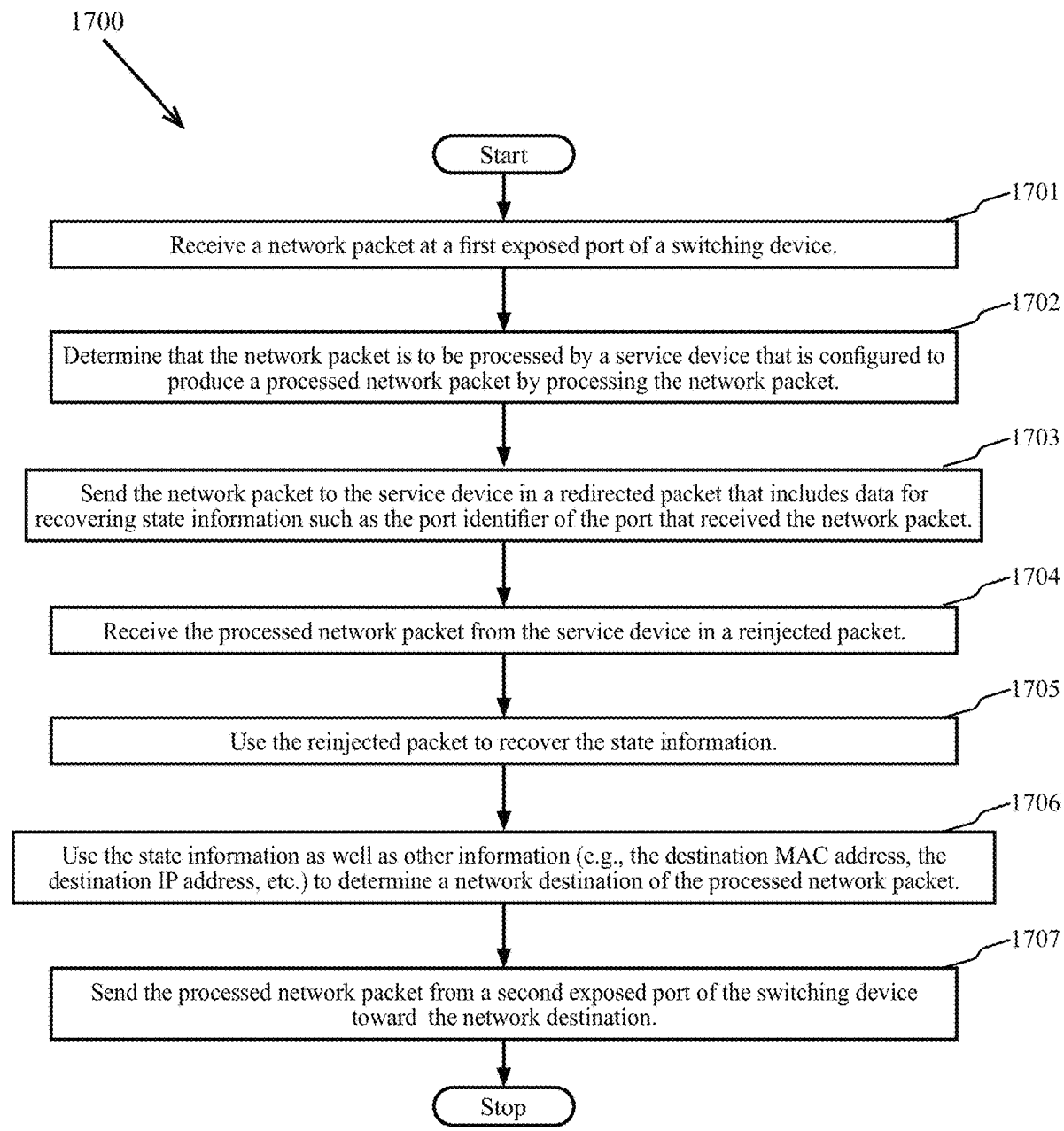
FIG. 17 is another high-level flow diagram illustrating a method for processing network packets using a service device in a smart switch according to some aspects.

FIG. 17 is another high-level flow diagram illustrating a method for processing network packets using a service device in a smart switch 1700 according to some aspects. After the start, at block 1701 the method can receive a network packet at a first exposed port of a switching device. At block 1702 the method can determine that the network packet is to be processed by a service device that is configured to produce a processed network packet by processing the network packet. At block 1703 the method can send the network packet to the service device in a redirected packet that includes data for recovering state information such as the port identifier of the port that received the network packet. At block 1704 the method can receive the processed network packet from the service device in a reinjected packet. The reinjected packet may include the for recovering the state information. At block 1705 the method can use the reinjected packet to recover the state information. At block 1706 the method can use the state information as well as other information (e.g., the destination MAC address, the destination IP address, etc.) to determine a network destination of the processed network packet. At block 1707 the method can send the processed network packet from a second exposed port of the switching device toward the network destination.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   receiving a network packet at a first layer 2 port of a switching device of a network appliance, the switching device configured to encapsulate the network packet in a redirected packet in response to a determination to forward the network packet to a service device of the network appliance;
   sending the redirected packet from the switching device to the service device, the redirected packet including the network packet and switching device metadata that includes a port identifier identifying the first layer 2 port;
   sending a reinjected packet from the service device to the switching device, the reinjected packet including the switching device metadata and a processed network packet that the service device is configured to produce by processing the network packet;
   using the switching device metadata in the reinjected packet to determine a network destination;
   sending the processed network packet from a second layer 2 port of the switching device to the network destination;
   wherein the first layer 2 port is a first exposed port of the network appliance; and
   wherein the first exposed port is configured to receive network traffic sent to the network appliance.

2. The method of claim 1 wherein:
   the network packet includes a virtual local area network (VLAN) identifier; and
   the switching device metadata includes the VLAN identifier.

3. The method of claim 1 wherein:
   the network packet includes a virtual local area network (VLAN) identifier;
   the redirected packet includes the VLAN identifier and the port identifier in a first QinQ header data; and
   the reinjected packet includes the VLAN identifier and the port identifier in a second QinQ header data.

4. The method of claim 1 wherein:
   the network packet includes a virtual local area network (VLAN) identifier; and
   the redirected packet is a HiGig or HiGig2 packet that includes the VLAN identifier and the port identifier.

5. The method of claim 1 wherein:
   the switching device is configured to use a third layer 2 port to send the redirected packet to the service device;
   the switching device is configured to prevent reconfiguration of the third layer 2 port by a user; and
   the switching device is configured to allow configuration of the first layer 2 port and the second layer 2 port by the user.

6. The method of claim 1 wherein:
   the switching device is a switching circuit that includes a traffic manager configured to inspect data associated with a packet and make a forwarding decision; and
   the service device is a service circuit that includes a CPU core and a P4 packet processing pipeline circuit that is configured to produce the processed network packet by processing the network packet.

7. The method of claim 6 wherein the redirected packet includes a host CPU destination indicator that indicates to the service device that the network packet has a destination address indicating a host CPU that is connected to the switching circuit and the service circuit by a PCIe bus.

8. The method of claim 1 wherein the switching device is a locked protocol device that implements a specific set of protocols and is unable to implement additional protocols.

9. The method of claim 1 wherein the switching device uses metadata associated with the processed network packet to prevent recirculating the processed network packet through the service device.

10. The method of claim 1 wherein:
    the network packet has an unknown destination;
    the service device processes a single copy of the network packet; and
    the switching device uses a plurality of layer 2 ports to transmit a plurality of copies of the processed network packet.

11. The method of claim 1, wherein:
    the switching device is configured to set a host CPU destination indicator that is in the switching device metadata in response to determining that a destination address of the network packet is an address of the network appliance.

12. The method of claim 1, wherein:
the service device is configured to implement a host CPU firewall rule in response to a CPU address destination indicator in the switching device metadata and before the network packet is provided to a host CPU of the network appliance.

13. A system comprising:
a network appliance;
a hardware ingress means for receiving a network packet sent to the network appliance;
a hardware egress means for transmitting a processed network packet from the network appliance to a network destination;
a switching means for encapsulating the network packet in a redirected packet in response to a determination to forward the network packet to a service means for producing the processed network packet by processing the network packet and encapsulating the processed network packet in a reinjected packet;
a private communication means for sending the redirected packet from the switching means to the service means and for sending the reinjected packet from the service means to the switching means;
a means for recovering a port identifier of the hardware ingress means from the reinjected packet; and
a means for using the port identifier to determine the network destination,
wherein:
the network appliance comprises the hardware ingress means, the switching means, the service means, and the private communications means;
the hardware ingress means is a first exposed port of the network appliance; and
the first exposed port is a layer 2 port configured to receive network traffic sent to the network appliance.

14. The system of claim 13 further including an enclosure that encloses the service means, the switching means, and the private communication means, and a host central processing unit (CPU) configured to communicate with the service means and the switching means.

15. A system comprising:
a network appliance that includes a service circuit and a switching circuit,
wherein:
the switching circuit is configured to receive a network packet on a first layer 2 port and to send the network packet in a redirected packet to the service circuit in response to a determination to forward the network packet to the service circuit, the redirected packet including the network packet and a port identifier that identifies the first layer 2 port,
the service circuit is configured to send a reinjected packet to the switching circuit in response to the redirected packet, the reinjected packet including the port identifier and a processed network packet produced by processing the network packet;
the switching circuit is configured to use the port identifier in the reinjected packet to determine a network destination and to send the processed network packet to the network destination;
wherein the first layer 2 port is a first exposed port of the network appliance; and
wherein the network appliance is configured to send and receive network traffic via the first exposed port.

16. The system of claim 15 wherein the switching circuit is a locked protocol device that implements a specific set of protocols and is unable to implement additional protocols.

17. The network appliance of claim 15 wherein:
the network packet includes a virtual local area network (VLAN) identifier;
the redirected packet includes the VLAN identifier and the port identifier; and
the reinjected packet includes the VLAN identifier and the port identifier.

18. The system of claim 15:
the network packet includes a virtual local area network (VLAN) identifier;
the redirected packet includes the VLAN identifier and the port identifier in a first QinQ header data; and
the reinjected packet includes the VLAN identifier and the port identifier in a second QinQ header data.

19. The system of claim 15, wherein:
the switching circuit is configured to send the redirected packet from a service port of the switching circuit;
the switching circuit is configured to prevent reconfiguration of the service port by a user; and
the switching circuit is configured to allow configuration of the first layer 2 port by the user.

20. The system of claim 15 further including:
a printed circuit board,
wherein the switching circuit and the service circuit are mounted on the printed circuit board.

21. The system of claim 15 wherein:
the network packet includes a virtual local area network (VLAN) identifier; and
the redirected packet includes switching circuit metadata that includes the VLAN identifier.

22. The system of claim 15 wherein:
the network packet includes a virtual local area network (VLAN) identifier; and
the redirected packet is a HiGig or HiGig2 packet that includes the VLAN identifier and the port identifier.

23. The system of claim 15 wherein:
the switching circuit is configured to use a second layer 2 port to send the redirected packet to the service circuit;
the switching circuit is configured to prevent reconfiguration of the second layer 2 port by a user; and
the switching circuit is configured to allow configuration of the first layer 2 port by the user.

24. The system of claim 15 wherein the service circuit includes a P4 packet processing pipeline circuit that is configured to produce the processed network packet by processing the network packet.

25. The system of claim 24 wherein the redirected packet includes a host CPU destination indicator indicating that the network packet has a destination address indicating a host CPU that is connected to the switching circuit and the service circuit by a PCIe bus.

26. The system of claim 15 wherein the switching circuit is configured to use metadata associated with the processed network packet to prevent recirculating the processed network packet through the service circuit.

27. The system of claim 15 wherein:
the switching circuit is configured to use a plurality of layer 2 ports to transmit a plurality of copies of the processed network packet.

28. The system of claim 15, wherein the switching circuit is configured to add a host CPU destination indicator to the redirected packet in response to determining that a destination address of the network packet is an address of the network appliance.

29. The system of claim 15, wherein the service circuit is configured to implement a host CPU firewall rule that, based on a CPU address destination indicator in the redirected packet, drops a packet before the packet is provided to a host CPU of the network appliance.

* * * * *